US012334027B2

(12) United States Patent
Furihata et al.

(10) Patent No.: US 12,334,027 B2
(45) Date of Patent: *Jun. 17, 2025

(54) BACKLIGHT CONTROL FOR DISPLAY DEVICES

(71) Applicant: Synaptics Incorporated, San Jose, CA (US)

(72) Inventors: Hirobumi Furihata, Tokyo (JP); Takashi Nose, Kanagawa (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,140

(22) Filed: Mar. 26, 2024

(65) Prior Publication Data

US 2025/0104658 A1 Mar. 27, 2025

Related U.S. Application Data

(63) Continuation-in-part of application No. 18/473,675, filed on Sep. 25, 2023, now Pat. No. 12,100,361.

(51) Int. Cl.
*G09G 3/34* (2006.01)

(52) U.S. Cl.
CPC ..................... *G09G 3/3426* (2013.01); *G09G 2320/0247* (2013.01); *G09G 2320/0686* (2013.01); *G09G 2360/144* (2013.01); *G09G 2360/16* (2013.01)

(58) Field of Classification Search
CPC ......... G09G 3/3426; G09G 2320/0247; G09G 2320/0686; G09G 2360/144
See application file for complete search history.

(56) References Cited

U.S. PATENT DOCUMENTS

| | | | | |
|---|---|---|---|---|
| 10,163,408 | B1 | 12/2018 | Chen et al. | |
| 11,281,047 | B1 | 3/2022 | Dunn et al. | |
| 11,776,489 | B2 | 10/2023 | Maekawa et al. | |
| 12,100,361 | B1 * | 9/2024 | Furihata | G09G 3/3406 |
| 2010/0073276 | A1 | 3/2010 | Koike et al. | |
| 2012/0120089 | A1 | 5/2012 | Byun et al. | |
| 2016/0225323 | A1 | 8/2016 | Lu et al. | |
| 2019/0206335 | A1 | 7/2019 | Wu | |
| 2019/0353961 | A1 | 11/2019 | Ji et al. | |

(Continued)

OTHER PUBLICATIONS

U.S. Appl. No. 18/473,675, filed Sep. 25, 2023.

(Continued)

*Primary Examiner* — Abbas I Abdulselam
(74) *Attorney, Agent, or Firm* — Leydig, Voit & Mayer, Ltd.

(57) ABSTRACT

A display device includes, a backlight device, and a backlight control circuit. The backlight device includes a plurality of light sources configured to illuminate a display panel. The backlight control circuit is configured to apply a filter to a target part of the input image to generate a filtered image part. The target part of the input image is displayed in a corresponding region of the display panel illuminated by a target light source of the plurality of light sources. The backlight control circuit is further configured to control a luminance level of the target light source based on a maximum pixel luminance level of the filtered image part and a local average picture level (APL) of the filtered image part.

20 Claims, 32 Drawing Sheets

(56) References Cited

U.S. PATENT DOCUMENTS

| | | | |
|---|---|---|---|
| 2023/0274710 | A1 | 8/2023 | Chen et al. |
| 2024/0038183 | A1 | 2/2024 | Furihata et al. |

OTHER PUBLICATIONS

U.S. Appl. No. 17/877,659, filed Jul. 29, 2022.
Extended European Search Report, dated Feb. 18, 2025, in EP Appn. No. 24200483.6.

* cited by examiner

BACKLIGHT CONTROL FOR DISPLAY DEVICES

CROSS-REFERENCE TO RELATED APPLICATIONS

This application is a continuation-in-part of U.S. patent application Ser. No. 18/473,675, filed Sep. 25, 2023, the entire disclosure of which is incorporated herein by reference.

TECHNICAL FIELD

This disclosure relates generally to panel display devices and more particularly to backlight control for display devices.

BACKGROUND

Display devices with light-transmissive display panels, such as light-transmissive liquid crystal display (LCD) panels, incorporate backlights that illuminate the light-transmissive display panels. Modern backlighting systems (e.g., direct-lit backlighting, full-array backlighting etc.) may illuminate a display panel with an array of light sources (e.g., light-emitting diodes (LEDs)) located behind the display panel. The light sources may be configured to illuminate respective regions of the display panel. The use of an array of light sources for backlighting facilitates local dimming that provides brighter and/or darker portions of the display image to enhance image quality.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a display device that includes a backlight device, and a backlight control circuit. The backlight device includes a plurality of light sources configured to illuminate a display panel. The backlight control circuit is configured to apply a filter to a target part of the input image to generate a filtered image part. The target part of the input image is displayed in a corresponding region of the display panel illuminated by a target light source of the plurality of light sources. The backlight control circuit is further configured to control a luminance level of the target light source based on a maximum pixel luminance level of the filtered image part and a local average picture level (APL) of the filtered image part.

In another exemplary embodiment, the present disclosure provides a display driver including a backlight control circuit coupled to a backlight device comprising a plurality of light sources that illuminate a display panel. The backlight control circuit is configured to apply a filter to a target part of the input image to generate a filtered image part. The target part of the input image is displayed in a corresponding region of the display panel illuminated by a target light source of the plurality of light sources. The backlight control circuit is further configured to control a luminance level of the target light source based on a maximum pixel luminance level of the filtered image part and a local APL of the filtered image part.

In yet another exemplary embodiment, the present disclosure provides a method. The method includes illuminating the display panel with a plurality of light sources of a backlight device. The method further includes applying a filter to a target part of an input image to generate a filtered image part. The target part of an input image is displayed in a corresponding region of the display panel illuminated by a target light source of the plurality of light sources. The method further includes controlling a luminance level of the target light source based on a maximum pixel luminance level of the filtered image part and a local APL of the filtered image part.

Further features and aspects are described in additional detail below with reference to the attached drawings.

Figure 1A:
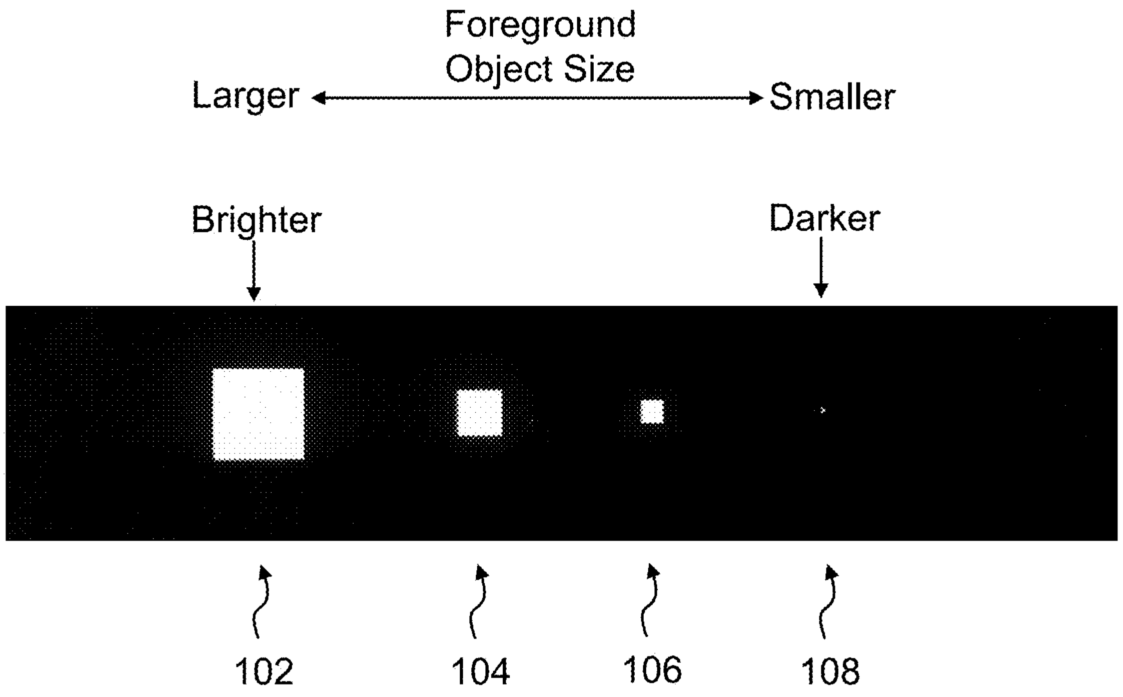
FIG. 1A shows examples of bright foreground objects with the same specified luminance level but different sizes displayed on a dark background, according to one or more examples of the present disclosure.

To facilitate understanding, identical reference numerals have been used, where possible, to designate elements that are common to the figures. It is contemplated that elements disclosed in one embodiment may be utilized in other embodiments without specific recitation. Suffixes may be attached to reference numerals for distinguishing elements from each other. The drawings referred to herein are not to be construed as being drawn to scale unless specifically noted. Also, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure provides devices and methods for backlight control for panel display devices that includes multiple light sources (e.g., LEDs) to illuminate a display panel (e.g., an LCD panel or other light-transmissive display panels). In various implementations, a backlight array that includes multiple light sources may be located behind a display panel, and the light sources may be configured to respectively illuminate corresponding regions of the display panel. The luminance level of each light source may be individually controlled to achieve local dimming that provides brighter and/or darker portions of the display image to enhance image contrast. In one implementation, the luminance of each light source may be determined based at least in part on pixel data of a set of pixels positioned near each light source, wherein the pixel data for a pixel may include the greylevels of respective colors (e.g., red, green, and blue) for the pixel.

In some implementations, the luminance level of each light source may be determined based on an average picture level (APL) of the corresponding zone of the display panel illuminated by each light source. The APL may be calculated based on pixel data of the pixels located in that zone of the display panel. In typical implementations, the luminance level of each light source increase as the APL increases. The APL-based luminance control of light sources may however suffer from the problem that a bright but small foreground object may be displayed with a luminance level lower than the specified luminance level as discussed below.

FIG. 1A shows examples of bright foreground objects (shown in white) with the same specified luminance level but different sizes displayed on a dark background (shown in black). Shown in FIG. 1A are four foreground objects 102, 104, 106, 108 with a high specified luminance level (e.g., the maximum luminance level). The foreground object 102 is the largest and the foreground object 108 is the smallest. Since the APL of the zone in which the largest foreground object 102 is displayed is relatively high, this zone is illuminated with a high luminance level, and thus the foreground object 102 can be displayed with the high specified luminance level. In contrast, because the APL of the zone in which the smallest foreground object 108 is displayed is relatively low, this zone is illuminated only with a low luminance level, and therefore the foreground object 108 may be displayed with a luminance level lower than the specified luminance level.

In other implementations, the luminance level of each light source may be determined based on the maximum pixel luminance level of the corresponding zone of the display panel illuminated by each light source. The maximum pixel luminance level of a certain zone referred to herein is the maximum value of the luminance levels of the pixels located in the zone. However, controlling the luminance level of each light source based on the maximum pixel luminance level may cause flickering when a bright but small foreground object moves between zones illuminated by adjacent light sources.

Figure 1B:
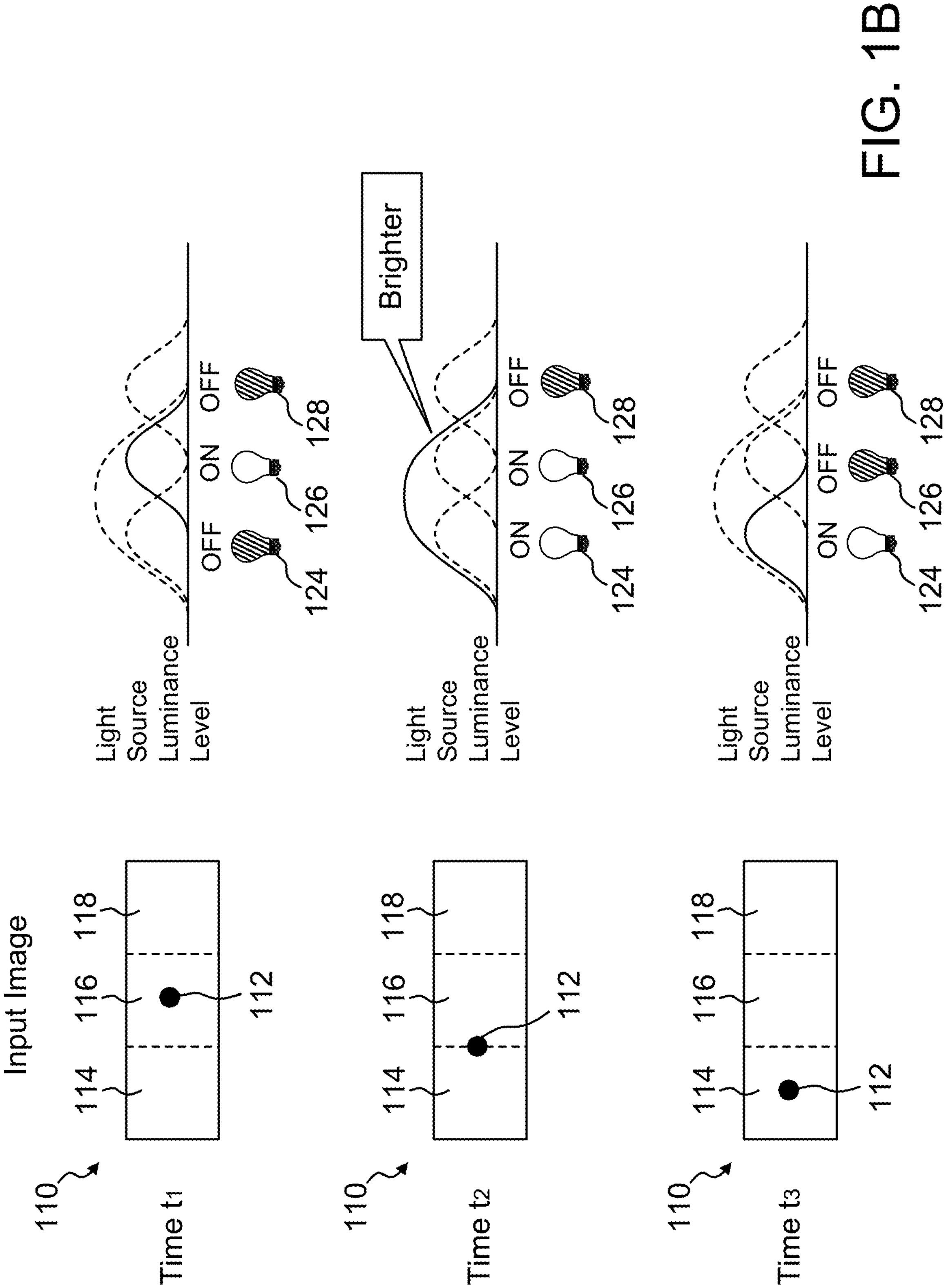
FIG. 1B shows an example in which a foreground object with the maximum luminance level moves between adjacent zones in a dark background of the lowest luminance level, according to one or more examples of the present disclosure.

FIG. 1B shows an example in which a foreground object 112 with the maximum luminance level (shown as a black solid circle in FIG. 1B) moves from within a zone 116 of a display panel 110 to within a zone 114 in the background with the lowest luminance level (shown as a white square in FIG. 1B). The top display panel and graph of FIG. 1B are at time $t_1$, the middle display panel and graph are at time $t_2$ that follows time $t_1$, and the bottom display panel and graph are at time $t_3$ that follows time $t_2$. In FIG. 1B, successive three zones 114, 116, and 118 are respectively illuminated with successive three light sources 124, 126, and 128, respectively, located behind the zones 114, 116, and 118. It is noted that each light source may be configured to partially illuminate nearby zones as well as the zone behind which each light source is disposed. The light sources 124, 126, and 128 may be configured to illuminate the zones 114, 116, and 118, respectively, based on the maximum pixel luminance levels in the zones 114, 116, and 118.

In the example shown in FIG. 1B, the movement of the foreground object 112 may cause flicker or an undesirable change in the luminance level of the display image. In this example, only the light source 126 emits light when the entirety of the foreground object 112 is within the zone 116 (e.g., at time $t_1$) and only the light source 124 emits light when the entirety of the foreground object 112 is within the zone 114 (e.g., at time $t_3$). While the foreground object 112 crosses the boundary between the zones 114 and 116 (e.g., at time $t_2$), both the light sources 124 and 126 emit light, and therefore the luminance of the displayed image may increase. The increase in the luminance may be perceived by the user as flicker.

The present disclosure provides various techniques for facilitating the display of a bright but small foreground object with a desired luminance level while mitigating or eliminating a flicker that may occur as a bright but small foreground object moves in the display image. The following is a description of embodiments of the present disclosure.

Figure 2:
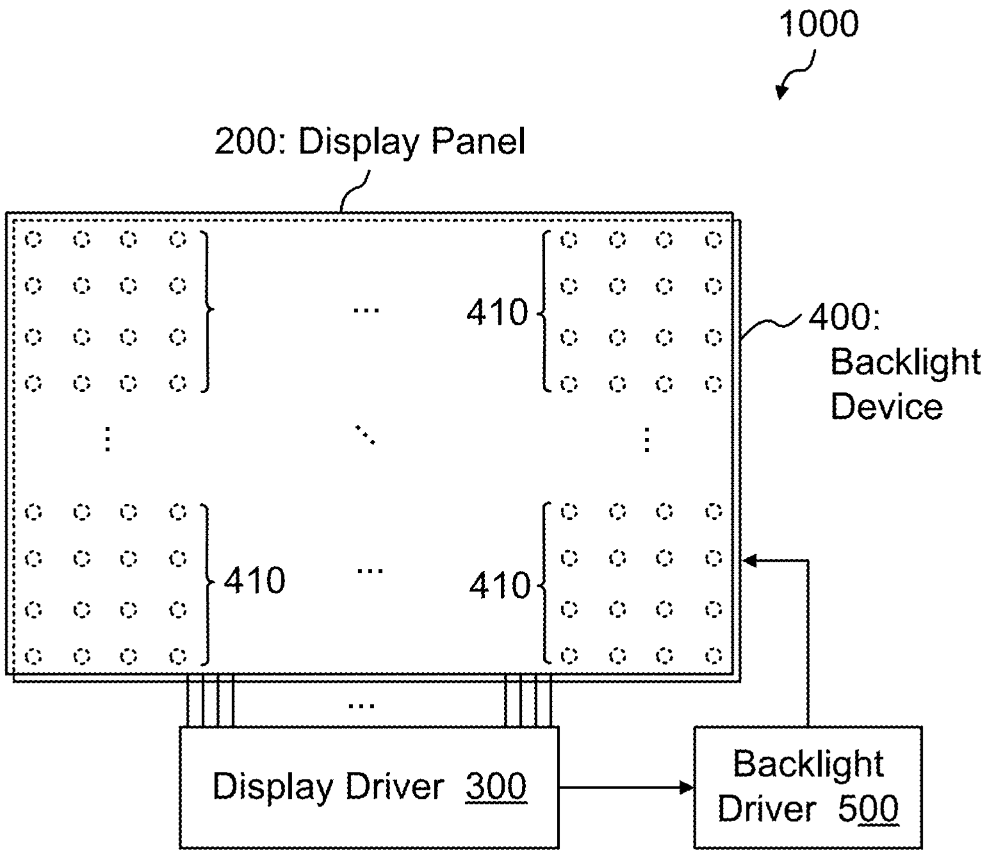
FIG. 2 shows an example configuration of a display device, according to one or more embodiments.

FIG. 2 shows an example configuration of a display device 1000, according to one or more embodiments. In the shown embodiment, the display device 1000 includes a display panel 200 and is configured to display desired images on the display panel 200. While FIG. 2 shows that the display panel 200 has a rectangular shape with right-angled corners, the display panel 200 may have a different shape (e.g., a rectangular shape with rounded corners). The display panel 200 may be a light-transmissive display panel, such as an LCD panel.

The display device 1000 further includes a display driver 300, a backlight device 400, and a backlight driver 500. The display driver 300 is configured to drive the display panel 200 to display a desired image on the display panel 200. The backlight device 400 is configured to illuminate the display panel 200. The backlight device 400 includes an array of light sources 410. It is noted that the light sources 410 are shown in phantom in FIG. 2 because the light sources 410 are located behind the display panel 200. While 64 light sources 410 are shown in FIG. 2, those skilled in the art would appreciate that the backlight device 400 may include more or less than 64 light sources 410. In actual implementations, the backlight device 400 may include several hundred to several thousand light sources 410. In one implementation, each light source 410 may include an LED or a different type of light source. In the shown embodiment, the light sources 410 are arranged in an array or matrix. In other embodiments, the light sources 410 may be arranged in an irregular or regular pattern. The backlight device 400 is coupled to the backlight driver 500. The backlight driver 500 is configured to drive the light sources 410 of the backlight device 400 under the control of the display driver 300 so that each light source 410 emits light with a luminance level specified by the display driver 300.

Figure 3:
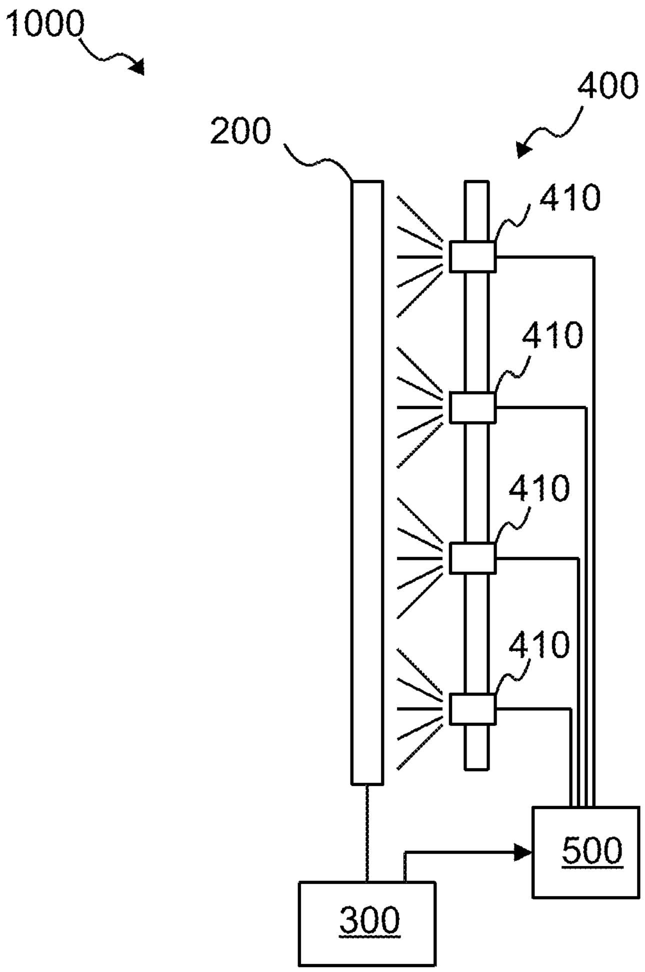
FIG. 3 is a side view showing the example configuration of the display device of FIG. 2, according to one or more embodiments.

As shown in FIG. 3, the light sources 410 are located behind the display panel 200 and configured to illuminate corresponding regions of the display panel 200. It is noted that the region of the display panel 200 illuminated by one light source 410 may partially overlap another region of the display panel 200 illuminated by another light source 410. Accordingly, a pixel of the display panel 200 may receive light from two or more light sources 410. While FIG. 3 shows four light sources 410, those skilled in the art would appreciate that the backlight device 400 may include more than four light sources 410.

Figure 4:
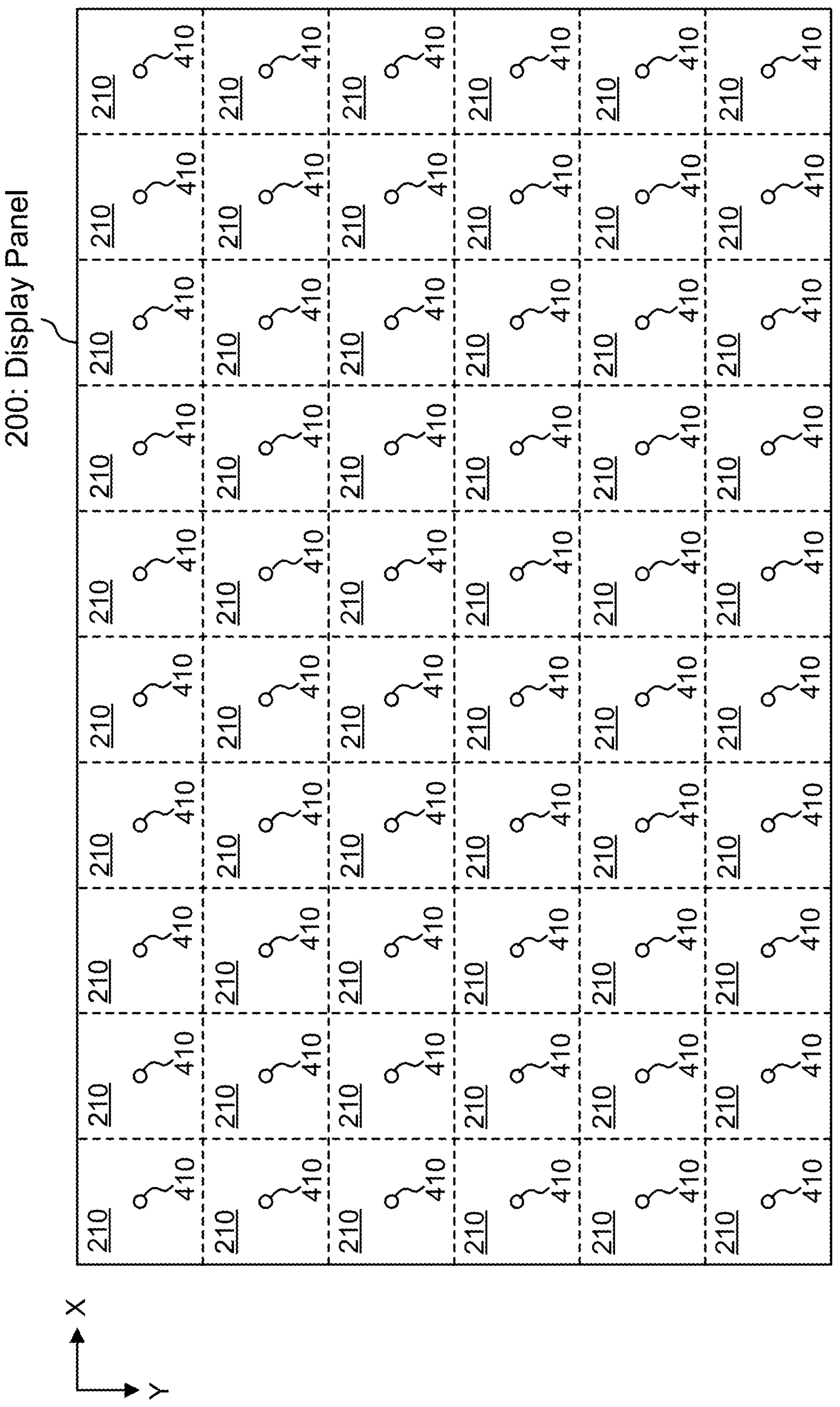
FIG. 4 shows an example arrangement of light sources, according to one or more embodiments.

FIG. 4 shows an example arrangement of the light sources 410, according to one or more embodiments. In the shown embodiment, the display panel 200 is segmented into rectangular zones 210 arranged in rows and columns, and the light sources 410 are located behind the corresponding zones 210, respectively. In one implementation, the zones 210 are square. In other implementations, the zones 210 may be defined in a different shape such that the zones 210 completely cover the display panel 200. Each light source 410 is located such that the projection of each light source 410 onto the display panel 200 is positioned at the center (e.g., the geometric center) of the corresponding one of the zones 210. As used herein, the "corresponding zone" 210 of a light source 410 refers to the zone 210 that includes the projection of that light source 410. Each light source 410 primarily illuminates the corresponding zone 210, but may secondarily illuminate at least portions of the zones 210 around (e.g., adjacent to) the corresponding zone 210.

Figure 5:
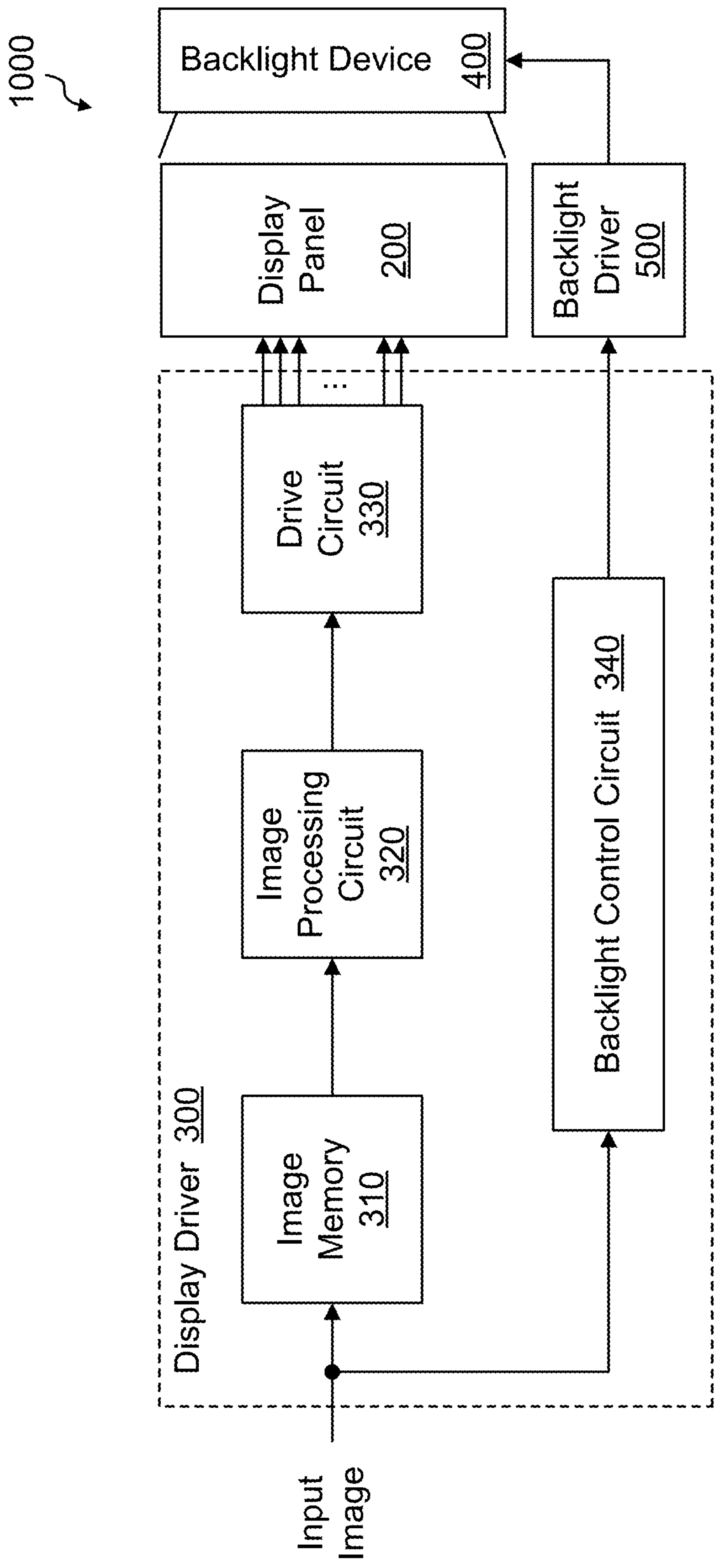
FIG. 5 shows an example configuration of a display driver, according to one or more embodiments.

FIG. 5 shows an example configuration of the display driver 300, according to one or more embodiments. In the shown embodiment, the display driver 300 includes an image memory 310, an image processing circuit 320, a drive circuit 330, and a backlight control circuit 340. The image memory 310 is configured to receive input image to be displayed on the display panel 200 from an external image source (not shown) and store the received input image therein. The input image is transmitted and stored in the image memory 310 in the form of pixel data of the pixels of the input image. In one implementation, the pixel data of each pixel includes greylevels of respective primitive colors (e.g., red (R), green (G), and blue (B)). In one implementation, each pixel of the display panel 200 may include R, G, and B subpixels configured to display red, green, and blue colors, respectively, and the pixel data of each pixel may include R, G, and B greylevels that specify the luminance levels of the R, G, and B subpixels, respectively. In an alternative embodiment, the image memory 310 may be omitted and the pixel data of the input image may be provided directly to the image processing circuit 320 and the backlight control circuit 340.

The image processing circuit 320 is configured to apply image processing to the pixel data of the input image received from the image memory 310 to generate processed pixel data. The image processing performed by the image processing circuit 320 may include color adjustment, demura correction, deburn correction, image scaling, gamma transformation, or other image processing.

The drive circuit 330 is configured to receive the processed pixel data from the image processing circuit 320 and drive respective pixels disposed in the display panel 200 based at least in part on the processed pixel data. In one implementation, each pixel in the display panel 200 may include R, G, and B subpixels and the processed pixel data may include the greylevels of the R, G, and B subpixels of each pixel. The drive circuit 330 may be configured to drive or update the R, G, and B subpixels of each pixel based at least in part on the processed pixel data to control the luminance levels of the R, G, and B subpixels as specified by the processed pixel data.

The backlight control circuit 340 is configured to generate and provide backlight control instructions to the backlight driver 500 based at least in part on the input image to control the luminance levels of the respective light sources 410 (shown in FIGS. 2 to 4) of the backlight device 400. The backlight control instructions may include specified luminance levels of the respective light sources 410. The backlight driver 500 is configured to drive the respective light sources 410 to cause the respective light sources 410 to emit light with the specified luminance levels.

Figure 6:
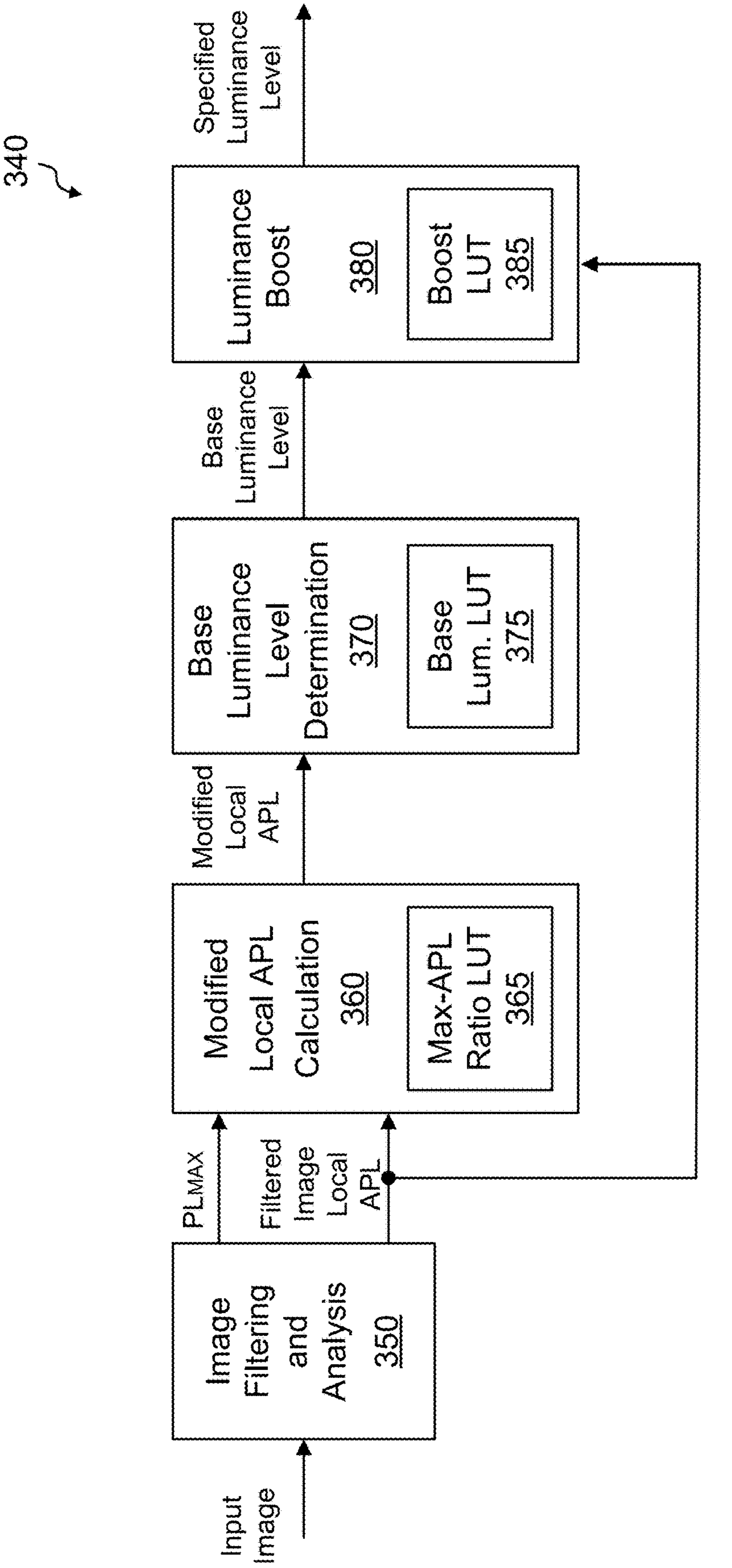
FIG. 6 shows an example configuration of a backlight control circuit, according to one or more embodiments.

FIG. 6 shows an example configuration of the backlight control circuit 340, according to one or more embodiments. In the shown embodiment, the backlight control circuit 340 includes an image filtering and analysis circuit 350, modified local APL calculation circuit 360, a base luminance level determination circuit 370, and a luminance boost circuit 380.

The image filtering and analysis circuit 350 is configured to receive the input image and apply filtering and analysis to the input image. The following is a detailed description of the function of the image filtering and analysis circuit 350.

Figure 7A:
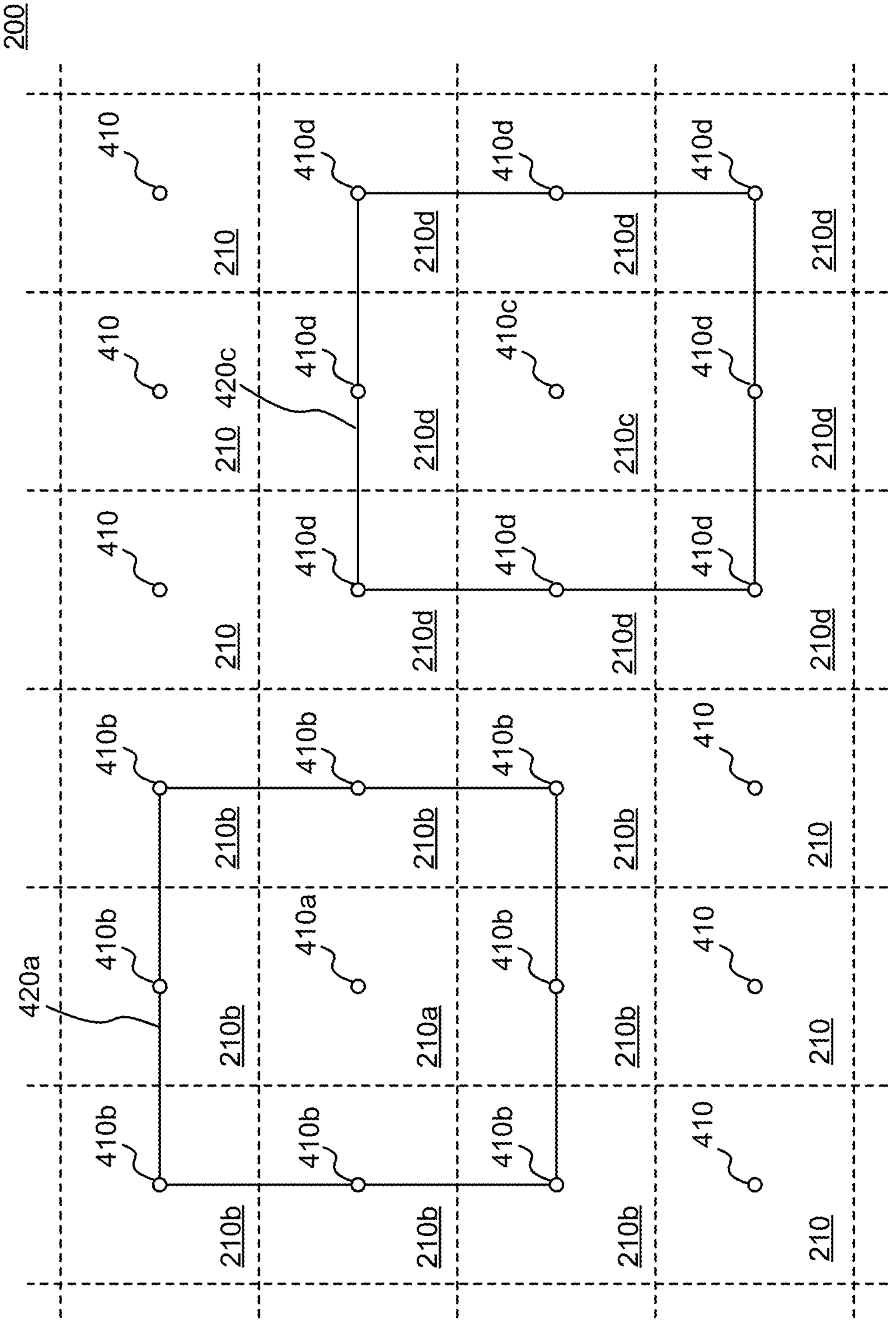
FIG. 7A shows an example selection of target parts of an input image for light sources, according to one or more embodiments.

The image filtering and analysis circuit 350 is configured to select a target part of the input image for each light source 410 such that the target part selected for each light source 410 is displayed in the corresponding region of the display panel 200 illuminated by each light source 410. FIG. 7A shows an example selection of target parts of the input image for light sources 410*a* and 410*c*, according to one or more embodiments. In FIG. 7A, the zone 210*a* is the corresponding zone of the light source 410*a* and the zone 210*c* is the corresponding zone of the light source 410*c*. The zones 210*b* are the zones adjacent to the corresponding zone 210*a* of the light source 410*a* and the zones 210*d* are the zones adjacent to the corresponding zone 210*c* of the light source 410*c*. The light sources 410*b* are the eight light sources 410 adjacent to the light source 410*a*, and the light sources 410*d* are the eight light sources 410 adjacent to the light source 410*c*.

In one implementation, the target part of the input image for the light source 410*a* is selected such that the target part is displayed in a corresponding region 420*a* of the display panel 200, wherein the corresponding region 420*a* is defined to be illuminated by the light source 410*a*. In the shown embodiment, the corresponding region 420*a* has a boundary that passes the projections of the eight light sources 410*b* adjacent to the light source 410*a* onto the display panel 200. The projections of four of the eight light sources 410*b* are at the four corners of the corresponding region 420*a* and the projections of the other four adjacent light sources 410*b* are on the four edges of the corresponding region 420*a*. In the shown implementation, the corresponding region 420*a* is square.

Similarly, the target part of the input image for the light source 410*c* is selected such that the target part is displayed in a corresponding region 420*c* of the display panel 200, wherein the corresponding region 420*c* is defined to be illuminated by the light source 410*c*. In the shown embodiment, the corresponding region 420*c* has a boundary that passes the projections of the eight light sources 410*d* adjacent to the light source 410*c* onto the display panel 200. The projections of four of the eight adjacent light sources 410*d* are at the four corners of the corresponding region 420*c* and the projections of the other four adjacent light sources 410*d* are on the four edges of the corresponding region 420*c*. In the shown implementation, the corresponding region 420*c* is square.

The target parts of the input image for other light sources 410 may be selected in a manner similar to the target parts for the light sources 410*a* and 410*c*. The target part for each light source 410 may be selected differently as long as the region of the display panel 200 in which the target part selected for each light source 410 is displayed incorporates at least the corresponding zone 210 for each light source 410.

It should be noted that target parts of the input image for adjacent light sources 410 may overlap with each other. In the example shown in FIG. 7A, the height and width of each target part are both twice as the height and width of a zone 210, and the target part for the light source 410*a* partially overlaps with target parts for its adjacent light sources 410*b*.

Referring back to FIG. 6, the image filtering and analysis circuit 350 is further configured to apply a filter to the target part of the input image for each light source 410 to generate a filtered image part. In one or more embodiments, the filter includes filter coefficients defined for the respective pixels of the target part of the input image, and the filtered image part is generated by applying the filter coefficients to pixel data of the respective pixels of the target part. In one implementation, the pixel data of the respective pixels of the filtered image part may be generated by multiplying the pixel data of the corresponding pixels of the target part by the filter coefficients defined for the corresponding pixels of the target part.

Figure 7B:
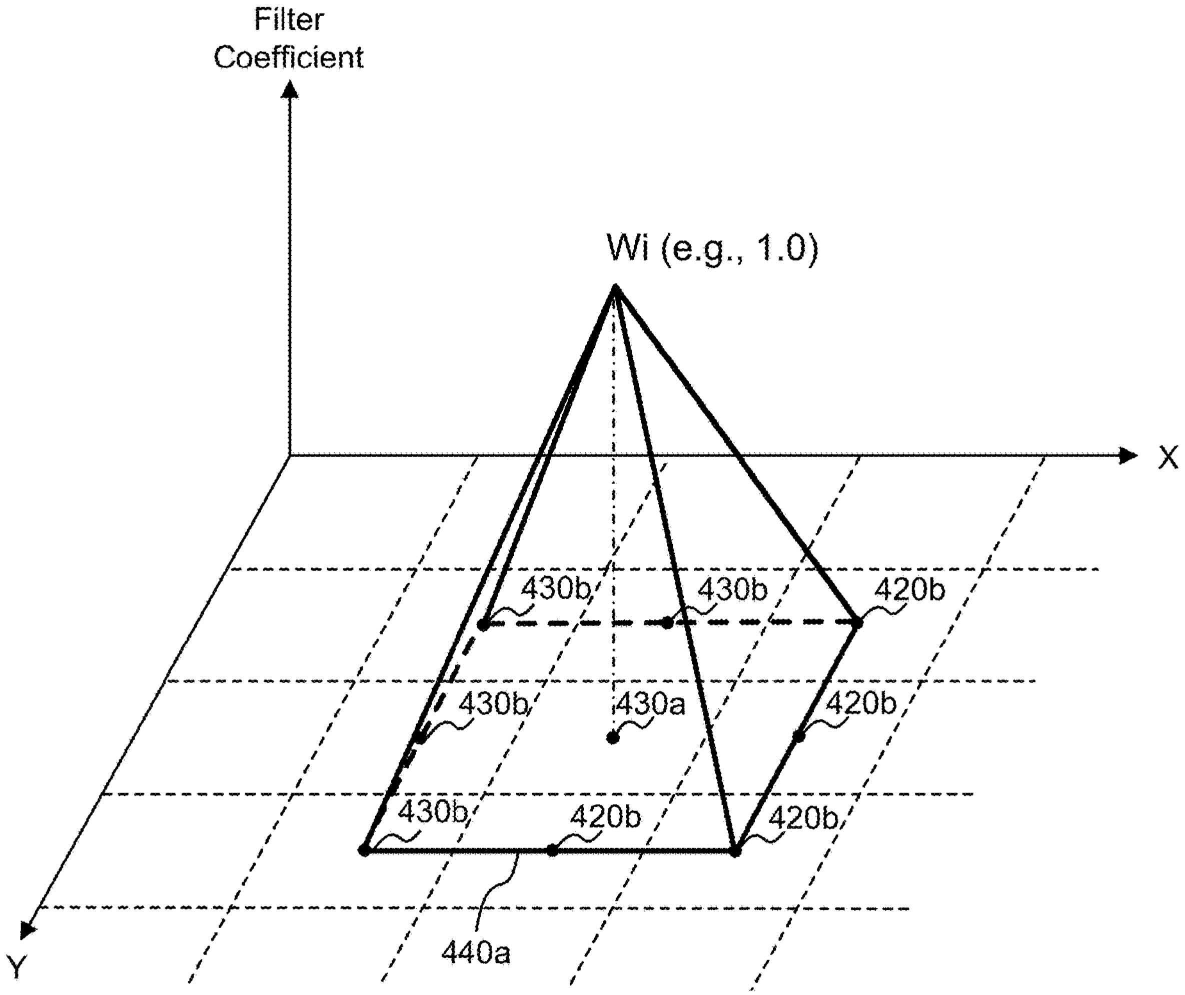
FIG. 7B shows an example of filter coefficients defined for pixels of a target part selected for a light source, according to one or more embodiments.

FIG. 7B shows an example of the filter coefficients defined for the pixels of the target part for the light source 410*a* (shown in FIG. 7A), according to one or more embodiments. Shown in FIG. 7B is a part of the input image that includes the target part for the light source 410*a*. The numeral 430*a* denotes the corresponding position of the light source 410*a* in the input image, and the numerals 430*b* denote the corresponding positions of the adjacent light sources 410*b* in the input image. The numeral 440*a* denotes the outer boundary of the target part for the light source 410*a*.

The filter coefficients defined for the pixels of the target part for the light source 410*a* depend on the respective distances between the pixels of the target part of the input image and the corresponding position 430*a* of the light source 410*a* in the input image. In one implementation, the filter coefficients defined for the pixels of the target part for the light source 410*a* increase as the respective distances between the pixels of the target part of the input image and the corresponding position 430*a* of the light source 410*a* in the input image decrease. In the shown embodiment, the filter coefficient for the pixel positioned at the corresponding position 430*a* of the light source 410*a* is Wi (e.g., 1.0), which is the maximum filter coefficient, and the filter coefficients for the pixels positioned at the outer boundary 440*a* of the target part are zero. The filter coefficients defined for other pixels of the target part for the light source 410*a* are values between zero and Wi. The filter coefficients thus defined are applied to the pixel data of the respective pixels of the target part to generate the filtered image part. The filter coefficients for the pixels of other target parts for other light sources 410 may be defined in a manner similar to the filter coefficients defined for the pixels of the target part for the light source 410*a* as shown in FIG. 7B.

Referring back to FIG. 6, the image filtering and analysis circuit 350 is further configured to analyze the filtered image part for each light source 410 to determine the maximum pixel luminance level $PL_{MAX}$ of the filtered image part and the APL of the filtered image part. The maximum pixel luminance level $PL_{MAX}$ referred to herein is the maximum value of the luminance levels of the pixels of the filtered image part. The APL of the filtered image part, which may also be referred to as the filtered image local APL, is the average of the pixel luminance levels of the filtered image part. The maximum pixel luminance level $PL_{MAX}$ and the filtered image local APL determined for each light source 410 are provided to the modified local APL calculation circuit 360.

Figure 8:
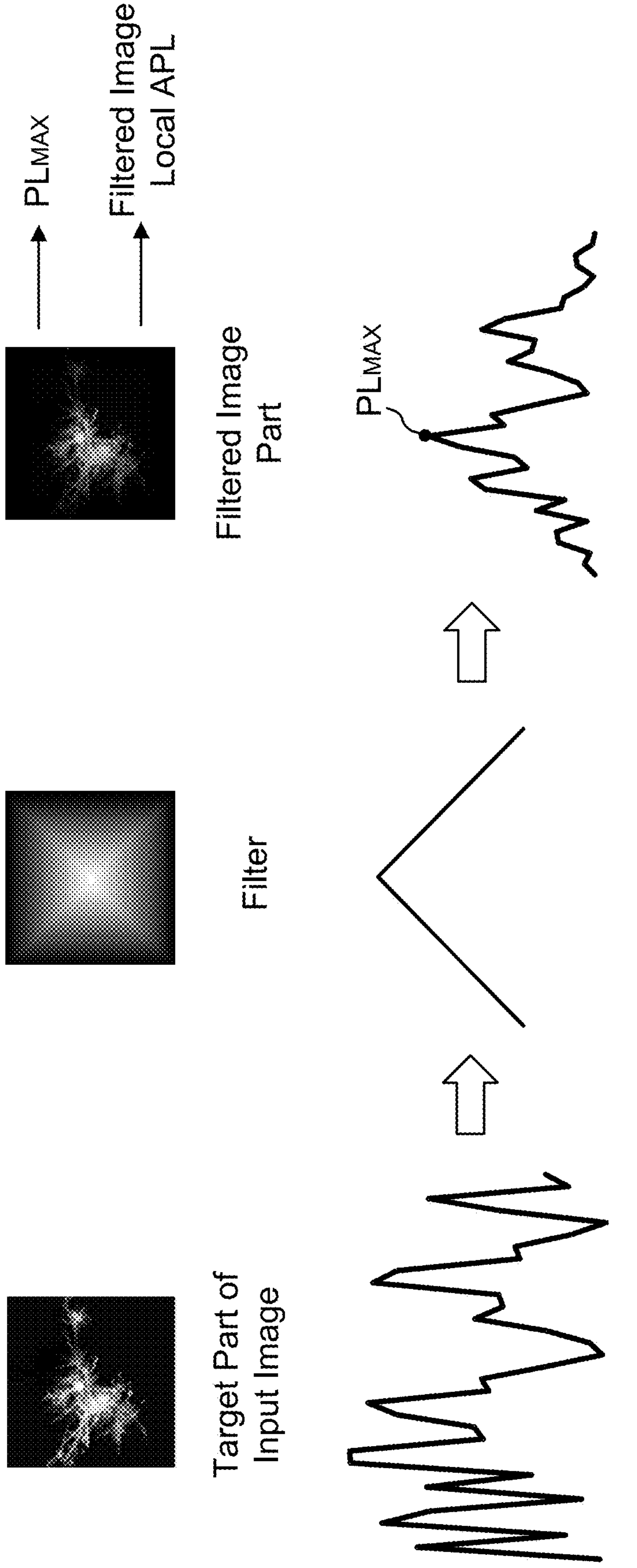
FIG. 8 shows a summary of image processing performed in an image filtering and analysis circuit, according to one or more embodiments.

FIG. 8 shows a summary of the image processing performed in the image filtering and analysis circuit 350, according to one or more embodiments. The image filtering and analysis circuit 350 is configured to first select the target part of the input image for each light source 410. As discussed above, the target part of the input image for each light source 410 is selected such that the target part is displayed in the corresponding region of the display panel 200 illuminated by each light source 410, as described in relation to FIG. 7A. The image filtering and analysis circuit 350 is further configured to apply a filter to the target part selected for each light source 410 to generate the filtered image part. The image filtering and analysis circuit 350 is further configured to determine the maximum pixel luminance level $PL_{MAX}$ and the filtered image local APL for the filtered image part generated for each light source 410.

In one or more embodiments, the backlight control circuit 340 is configured to determine a specified luminance level for each light source 410 based on the filtered image local APL and the maximum pixel luminance level $PL_{MAX}$ of the filtered image part generated for each light source 410. The specified luminance level for each light source 410 is provided to the backlight driver 500, which is responsive to the specified luminance level to control the luminance level of each light source 410. Determining the specified luminance level for each light source 410 based on the filtered image local APL effectively provides the local dimming function, while determining the specified luminance level also based on the maximum pixel luminance level $PL_{MAX}$ effectively mitigates the undesired decrease in the luminance level of a bright but small foreground object. Meanwhile, using the filtered image part (instead of the target part) to determine the maximum pixel luminance level $PL_{MAX}$ effectively mitigates a flicker that may occur when a bright but small foreground object moves between zones illuminated by adjacent light sources, because the maximum pixel luminance level $PL_{MAX}$ is reduced when the bright but small foreground object is located at an intermediate position between the adjacent light sources.

In embodiments where target parts of the input image selected for adjacent light sources 410 overlap with each other, the target parts selected for the adjacent light sources 410 share some pixels, and two or more filter coefficients defined for two or more light sources 410 are assigned to each of the shared pixels. In such embodiments, the sum of the filter coefficients assigned to each of the shared pixels may be kept constant. This may effectively mitigate flicker that may occur as a bright but small foreground object moves between zones illuminated by adjacent light sources. In embodiments where the filter coefficients are values in the range between 0.0 and 1.0, inclusive, the sum of the filter coefficients assigned to each of the shared pixels may be 1.0.

Figure 9A:
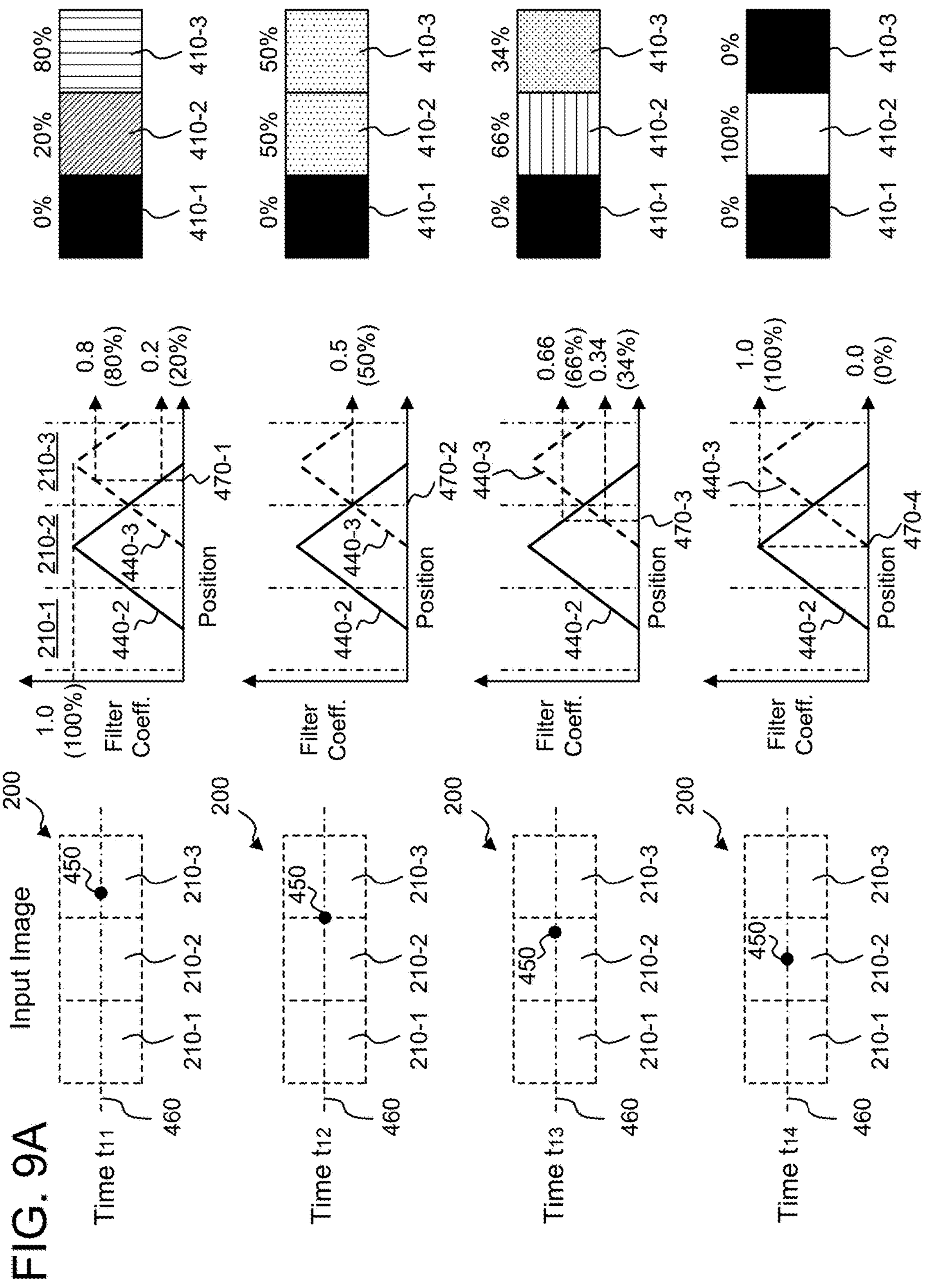
FIG. 9A shows an example mitigation of flicker, according to one or more embodiments.

FIG. 9A shows an example of mitigating flicker when a foreground object 450 with the maximum luminance level moves from within a zone 210-3 of the display panel 200 to within a zone 210-2, according to one or more embodiments. The top display panel and graph of FIG. 9A are at time $t_{11}$, the second top display panel and graph are at time $t_{12}$ that follows time $t_{11}$, the second bottom display panel and graph are at time $t_{13}$ that follows time $t_{12}$, and the bottom display panel and graph are at time $t_{14}$ that follows time $t_{13}$.

Figure 9B:
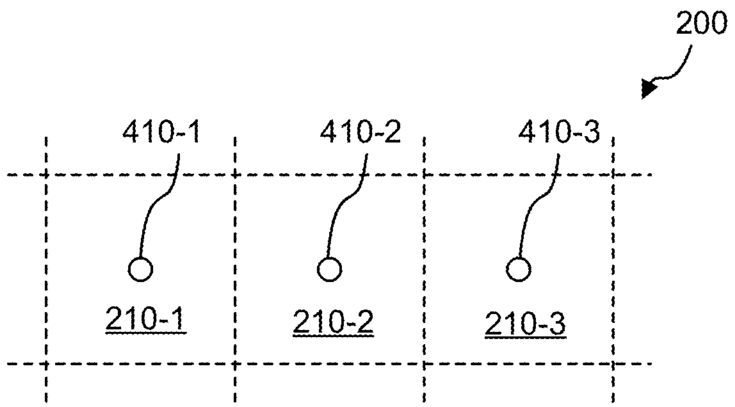
FIG. 9B is a partial view of a display device showing an example arrangement of zones and corresponding light sources, according to one or more embodiments.

The left column of FIG. 9A shows zones 210-1, 210-2, and 210-3 of the display panel 200 and a bright but small foreground object 450 that moves from within the zone 210-3 to within the zone 210-2 along a trajectory 460 that passes through the centers of the zones 210-1, 210-2, and 210-3. The middle column of FIG. 9A shows filter coefficients assigned to pixels arranged along the trajectory 460, and the right column shows the luminance levels of the light sources 410-1, 410-2, and 410-3, wherein the light sources 410-1, 410-2, and 410-3 are located behind the zones 210-1, 210-2, and 210-3 as shown in FIG. 9B. In one implementation, the projections of the light sources 410-1, 410-2, and 410-3 onto the display panel are positioned at the centers of the zones 210-1, 210-2, and 210-3, respectively.

Referring back to the middle column of FIG. 9A, the trendline 440-2 indicates the filter coefficients assigned to the pixels used to generate the filtered image part for the light source 410-2 and the trendline 440-3 indicates the filter coefficients assigned to the pixels used to generate the filtered image part for the light source 410-3. The filter coefficients assigned to the pixels arranged along the trajectory 460 for generating the filtered image part for the light source 410-2 increase toward the center of the zone 210-2 and take the maximum value of 1.0. Correspondingly, the filter coefficients assigned to the pixels arranged along the trajectory 460 for generating the filtered image part for the light source 410-3 increase toward the center of the zone 210-3 and take the maximum value of 1.0. In the shown embodiment, the sum of the filter coefficients assigned to each pixel for generating the filtered image parts for the light sources 410-2 and 410-3 is kept constant over the pixels arranged along the trajectory 460. In the shown embodiment, the sum of the filter coefficients assigned to each pixel is kept constant at 1.0.

For example, as shown in the topmost graph of the middle column, the pixel at a position 470-1 in the zone 210-3 is assigned with a filter coefficient of 0.2 for generating the filtered image part for the light source 410-2, while being assigned with a filter coefficient of 0.8 for generating the filtered image part for the light source 410-3. Further, as shown in the second graph from the top, the pixel at a position 470-2 at the boundary between the zones 210-2 and 210-3 is assigned with a filter coefficient of 0.5 for generating the filtered image parts for both light sources 410-2 and 410-3. Further, as shown in the second graph from the bottom, the pixel at a position 470-3 in the zone 210-2 is assigned with a filter coefficient of 0.66 for generating the filtered image part for the light source 410-2, while being assigned with a filter coefficient of 0.34 for generating the filtered image part for the light source 410-3. Finally, as shown in the bottommost graph, the pixel at the center 470-4 of the zone 210-2 is assigned with a filter coefficient of 1.0 for generating the filtered image part for the light source 410-2, while being assigned with a filter coefficient of 0.0 for generating the filtered image part for the light source 410-3.

The shown assignment of the filter coefficients to the respective pixels effectively reduces changes in the image luminance, thereby mitigating or eliminating the occurrence of flicker. In the shown example, when the foreground object 450 is positioned at the position 470-1 at time $t_{11}$, the maximum pixel luminance level $PL_{MAX}$ of the filtered image part generated for the light source 410-2 is approximately 20% due to the filter coefficient of 0.2 (i.e., 20%) used for generating the filtered image part for the light source 410-2, while the maximum pixel luminance level $PL_{MAX}$ of the filtered image part generated for the light source 410-3 is approximately 80% due to the filter coefficient of 0.8 (i.e., 80%) used for generating the filtered image part for the light source 410-3. Accordingly, as shown in the topmost figure of the right column of FIG. 9A, the light source 410-2 emits light with a luminance level of approximately 20% and the light source 410-3 emits light with a luminance level of approximately 80%.

When the foreground object 450 is positioned at the position 470-2 at time $t_{12}$, the maximum pixel luminance levels $PL_{MAX}$ of the filtered image parts generated for the light sources 410-2 and 410-3 are both approximately 50% due to the filter coefficient of 0.5 (i.e., 50%) used for generating the filtered image parts for the light sources 410-2 and 410-3. Accordingly, as shown in the second figure from the top of the right column of FIG. 9A, both of the light sources 410-2 and 410-3 emit light with a luminance level of approximately 50%.

When the foreground object 450 is positioned at the position 470-3 at time $t_{13}$, the maximum pixel luminance level $PL_{MAX}$ of the filtered image part generated for the light source 410-2 is approximately 66% due to the filter coefficient of 0.66 (i.e., 66%) used for generating the filtered image part for the light source 410-2, while the maximum pixel luminance level $PL_{MAX}$ of the filtered image part generated for the light source 410-3 is approximately 34% due to the filter coefficient of 0.34 (i.e., 34%) used for generating the filtered image part for the light source 410-3. Accordingly, as shown in the second figure from the bottom of the right column of FIG. 9A, the light source 410-2 emits light with a luminance level of approximately 66% and the light source 410-3 emits light with a luminance level of approximately 34%.

When the foreground object 450 is positioned at the center 470-4 of the zone 210-2 at time $t_{14}$, the maximum pixel luminance level $PL_{MAX}$ of the filtered image part generated for the light source 410-2 is approximately 100% due to the filter coefficient of 1.0 (i.e., 100%) used for generating the filtered image part for the light source 410-2, while the maximum pixel luminance level $PL_{MAX}$ of the filtered image part generated for the light source 410-3 is approximately 0% due to the filter coefficient of 0.0 (i.e., 0%) used for generating the filtered image part for the light source 410-3. Accordingly, as shown in the bottommost figure of the right column of FIG. 9A, the light source 410-2 emits light with a luminance level of approximately 100% and the light source 410-3 emits light with a luminance level of approximately 0%. Thus, the sum of the luminance levels of the light sources 410-2 and 410-3 is kept approximately constant at 100%.

Referring back to FIG. 6, the modified local APL calculation circuit 360, the base luminance level determination circuit 370, and the luminance boost circuit 380 collectively form a circuit configured to determine the specified luminance level of each light source 410 based on the maximum pixel luminance level $PL_{MAX}$ and the filtered image local APL of the filtered image part generated for each light source 410. The operations of the modified local APL calculation circuit 360, the base luminance level determination circuit 370, and the luminance boost circuit 380 are described in detail below.

The modified local APL calculation circuit 360 is configured to determine a modified local APL for each light source 410 based on the maximum pixel luminance level $PL_{MAX}$ and the filtered image local APL of the filtered image part generated for each light source 410. In one implementation, the modified local APL for each light source 410 may be a weighted average of the maximum pixel luminance level $PL_{MAX}$ and the filtered image local APL of the filtered image part generated for each light source 410. The weights assigned to the maximum pixel luminance level $PL_{MAX}$ and the filtered image local APL are determined based on the filtered image local APL.

In some embodiments, the modified local APL calculation circuit 360 may include a max-APL ratio lookup table (LUT) 365 that stores information that indicates the relationship between the filtered image local APL and the weight assigned to the maximum pixel luminance level $PL_{MAX}$. In such embodiments, the modified local APL calculation circuit 360 may be configured to determine the weights assigned to the maximum pixel luminance level $PL_{MAX}$ and the filtered image local APL with reference to the max-APL ratio LUT 365, and to calculate the modified local APL as the weighted average of the maximum pixel luminance level $PL_{MAX}$ and the filtered image local APL using the determined weights.

Figure 10:
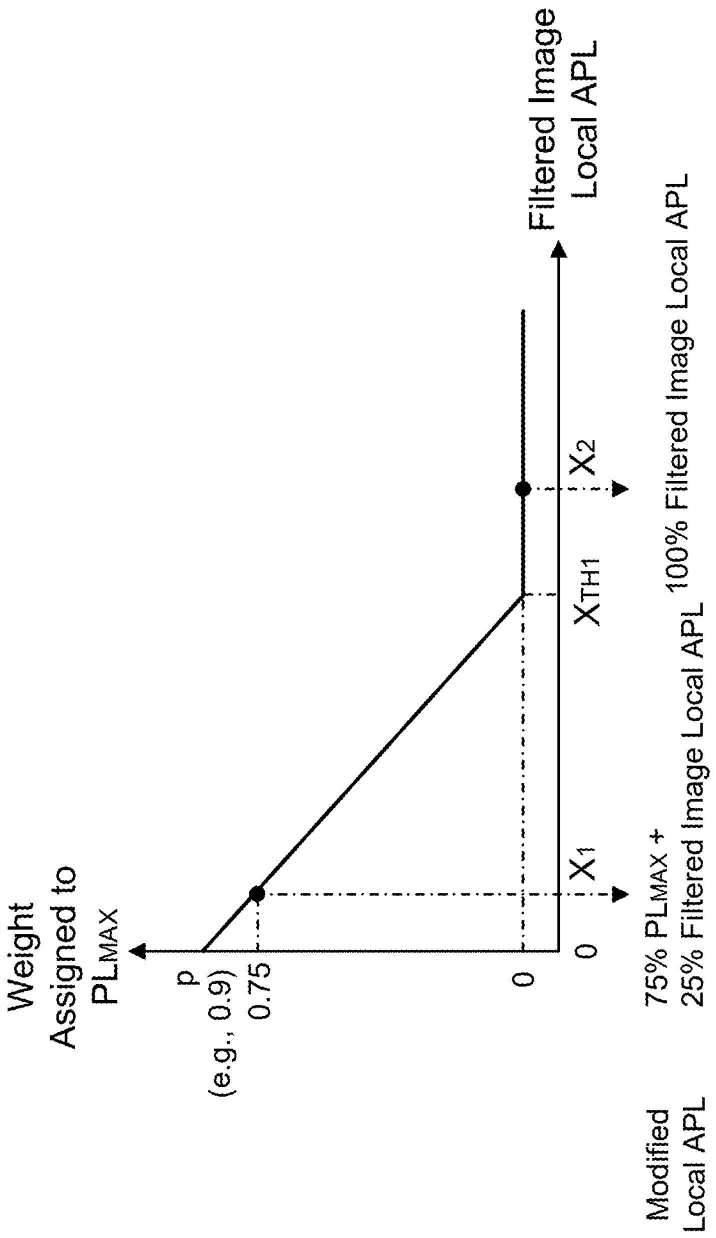
FIG. 10 shows an example relationship between a filtered image local APL and a weight assigned to the maximum pixel luminance level of a target part, according to one or more embodiments.

FIG. 10 shows an example relationship between the filtered image local APL and the weight assigned to the maximum pixel luminance level $PL_{MAX}$, according to one or more embodiments. It is noted that the sum of the weights assigned to the maximum pixel luminance level $PL_{MAX}$ and the filtered image local APL is assumed to be 1.0 in the shown embodiment. Overall, the weight assigned to the maximum pixel luminance level $PL_{MAX}$ decreases in a monotonically non-increasing manner with the filtered image local APL in the shown embodiment. The details of the example relationship between the filtered image local APL and the weight assigned to the maximum pixel luminance level $PL_{MAX}$ are described below.

In the shown embodiment, when the filtered image local APL is zero, the weight assigned to the maximum pixel luminance level $PL_{MAX}$ is p, where p is a number between 0.0 (or 0%) and 1.0 (or 100%). When the filtered image local APL is in the range between zero and a predetermined threshold $X_{TH1}$, the weight assigned to the maximum pixel luminance level $PL_{MAX}$ monotonically decreases as the filtered image local APL increases. While FIG. 10 shows that the weight assigned to the maximum pixel luminance level $PL_{MAX}$ linearly decreases as the filtered image local APL increases, the weight assigned to the maximum pixel luminance level $PL_{MAX}$ may non-linearly decrease as the filtered image local APL increases. The weight assigned to the maximum pixel luminance level $PL_{MAX}$ is 0.0 when the filtered image local APL is greater than or equal to the threshold value $X_{TH1}$. In this case, the weight assigned to the filtered image local APL is 1.0.

In the shown embodiment, when the filtered image local APL is $X_1$, which is a value between zero and the threshold $X_{TH1}$, the weight assigned to the maximum pixel luminance level $PL_{MAX}$ is 0.75 (or 75%) and the weight assigned to the filtered image local APL is 0.25 (or 25%). In this case, the modified local APL is the sum of 75% of the maximum pixel luminance level $PL_{MAX}$ and 25% of the filtered image local APL. When the filtered image local APL is $X_2$, which is a value greater than the threshold $X_{TH1}$, the weight assigned to the maximum pixel luminance level $PL_{MAX}$ is 0 (or 0%) and the weight assigned to the filtered image local APL is 1.0 (or 100%). In this case, the modified local APL is equal to the filtered image local APL. As thus described, the modified local APL is calculated as the weighted average of the maximum pixel luminance level $PL_{MAX}$ and the filtered image local APL using the respective weights determined depending on the filtered image local APL.

Referring back to FIG. 6, the base luminance level determination circuit 370 is configured to determine a base luminance level for each light source 410 based on the modified local APL determined for each light source 410. In some embodiments, the base luminance level determination circuit 370 may include a base luminance LUT 375 that stores information that indicates the relationship between the base luminance level for each light source 410 and the modified local APL. In such embodiments, the base luminance level determination circuit 370 may be configured to refer to the base luminance LUT 375 to determine the base luminance level for each light source 410 based on the modified local APL determined for each light source 410.

Figure 11:
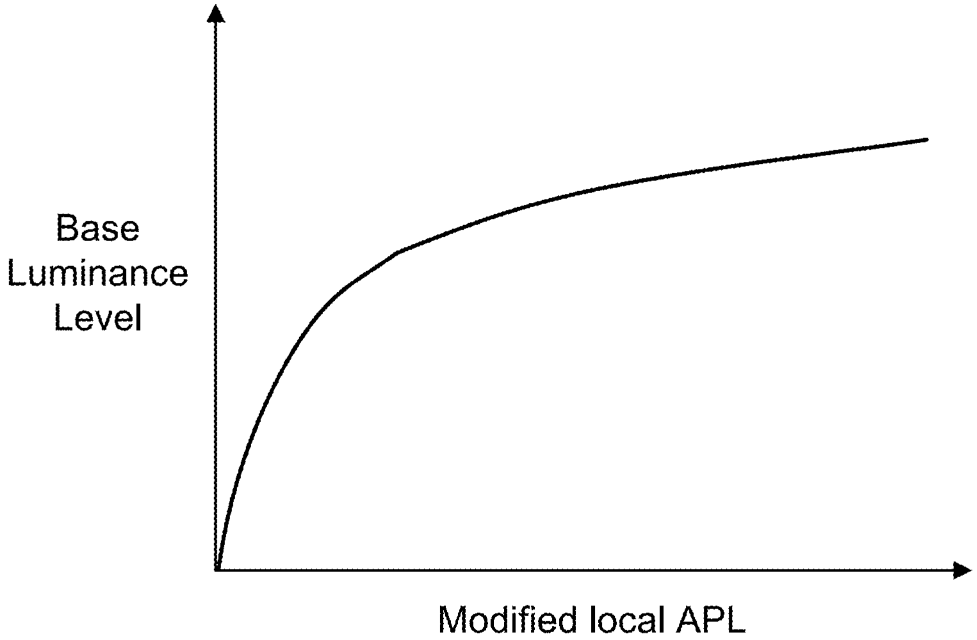
FIG. 11 shows an example relationship between a modified local APL and a base luminance level, according to one or more embodiments.

FIG. 11 shows an example relationship between the base luminance level for each light source 410 and the modified local APL, according to one or more embodiments. The base luminance level for each light source 410 monotonically increases as the modified local APL determined for each light source 410 increases. In the shown embodiment, the base luminance level non-linearly increases as the modified local APL increases. In other embodiments, the base luminance level linearly may increase as the modified local APL increases. In embodiments where the base luminance level determination circuit 370 includes the base luminance LUT 375, the base luminance LUT 375 may store values of the base luminance level for corresponding values of the modified local APL.

Referring back to FIG. 6, the luminance boost circuit 380 is configured to determine the specified luminance level for each light source 410 based on the base luminance level for each light source 410 and the filtered image local APL of the filtered image part generated for each light source 410. In one or more embodiments, determining the specified luminance level for each light source 410 involves determining a boosting factor based on the filtered image local APL for each light source 410 and applying the boosting factor to the base luminance level for each light source 410. The boosting factor determines whether "boosting" is performed in determining the specified luminance level. The "boosting" referred herein is to determine the specified luminance level to be higher than the base luminance level. In the shown embodiment, the boosting factor is determined such that "boosting" is performed when the filtered image local APL is less than the threshold $X_{TH2}$. In this case, the specified luminance level is higher than the base luminance level. When the filtered image local APL is greater than or equal to the threshold $X_{TH2}$, the boosting factor is determined such that "boosting" is not performed. In this case, the specified luminance level is equal to the base luminance level. In one implementation, the specified luminance level of each light source 410 may be determined by multiplying the base luminance level by the boosting factor.

The luminance boost circuit 380 may include a boost LUT 385 that stores information that indicates the relationship between the boosting factor and the filtered image local APL. In such embodiments, the luminance boost circuit 380 may be configured to refer to the boost LUT 385 to determine the boosting factor.

Figure 12:
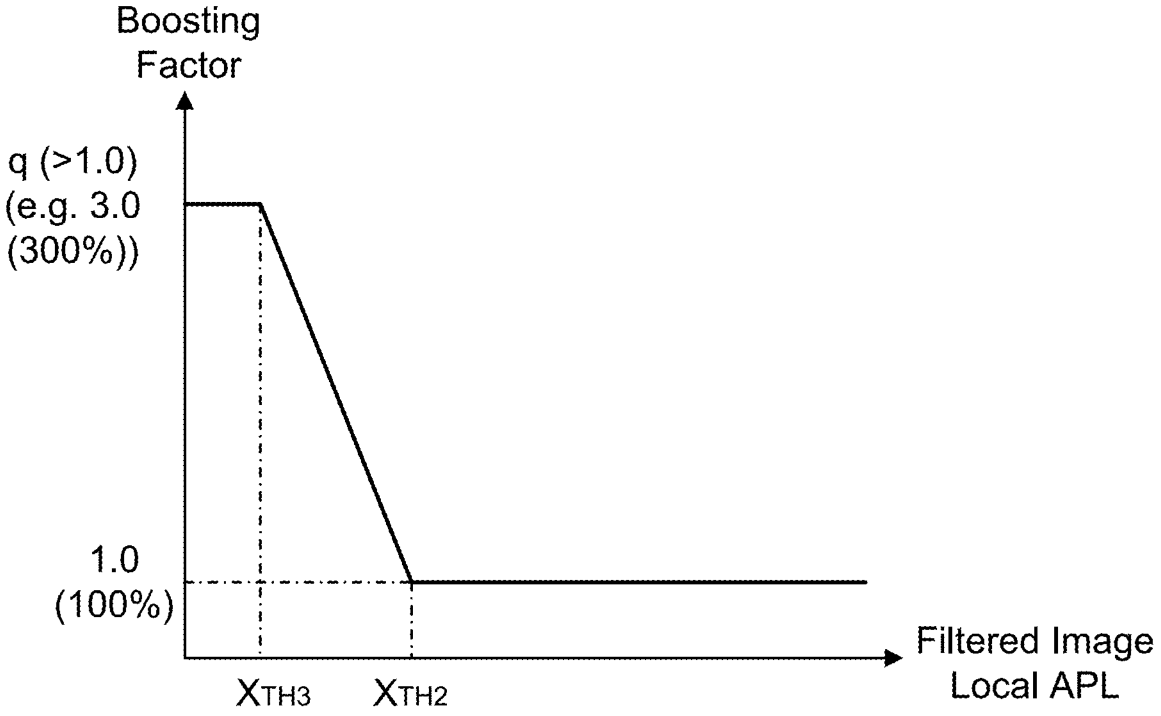
FIG. 12 shows an example relationship between a filtered image local APL and a boosting factor, according to one or more embodiments.

FIG. 12 shows an example relationship between the boosting factor and the filtered image local APL, according to one or more embodiments. The relationship shown in FIG. 12 may be used in embodiments where the specified luminance level of each light source 410 is determined by multiplying the base luminance level for each light source 410 by the boosting factor. In the shown embodiment, the boosting factor is 1.0 (or 100%) when the filtered image local APL is greater than or equal to the threshold $X_{TH2}$ (i.e., "boosting" is not performed), and is greater than 1.0 (or greater than 100%) when the filtered image local APL is less than the threshold $X_{TH2}$ (i.e., "boosting" is performed). More specifically, the boosting factor is the maximum value q (or 100q %) when the filtered image local APL is less than or equal to a threshold $X_{TH3}$, where q is greater than 1.0. In one implementation, the maximum value q may be 3.0 (or 300%). In other implementations, the maximum value q may be a different value greater than 1.0. When the filtered image local APL is in the range between the thresholds $X_{TH3}$ and $X_{TH2}$, the boosting factor decreases from q to 1.0 as the filtered image local APL increases. While FIG. 12 shows that the boosting factor linearly decreases from q to 1.0, the boosting factor may non-linearly decrease.

The boosting factor is determined to allow the specified luminance level of a light source 410 to exceed an all-white luminance level for part of the allowed range of the filtered image local APL of the filtered image part generated for the light source 410. The all-white luminance level referred to herein is the luminance level of the light source 410 for the case where pixel luminance levels of all the pixels of the target part selected for the light source 410 has the maximum pixel luminance. In the shown embodiment, the maximum value q of the boosting factor is determined to allow the specified luminance level of the light source 410 to exceed the all-white luminance level at least when the filtered image local APL is less than or equal to a threshold $X_{TH3}$. This implies that, when a bright but small foreground object is displayed in the target part selected for the light source 410, the specified luminance level of the light source 410 is "boosted" to allow the foreground object to be displayed with a desired high luminance level.

The specified luminance level for each light source 410, determined based on the base luminance level and the boosting factor, is provided to the backlight driver 500 (shown in FIG. 5). The backlight driver 500 drives each light source 410 to allow each light source 410 to emit light with the specified luminance level determined for each light source 410.

Figure 13A:
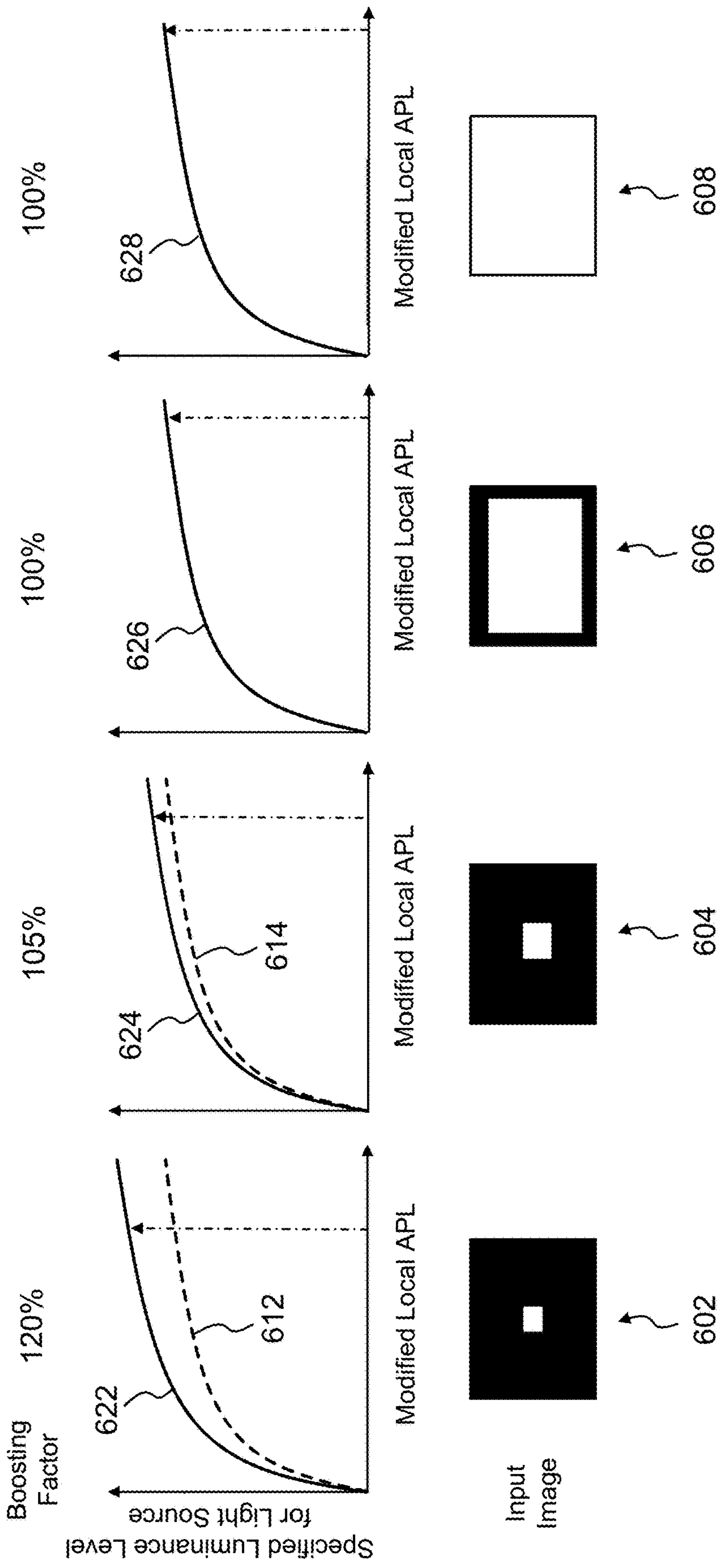
FIG. 13A shows example operations for displaying bright foreground objects on dark backgrounds, according to one or more embodiments.

FIG. 13A shows example operations for displaying bright foreground objects, denoted by numerals 602, 604, 606, and 608, respectively, on dark backgrounds, according to one or more embodiments. The dashed lines 612 and 614 indicate example relationships between the base luminance level and the modified local APL, and the solid lines 622, 624, 626, and 628 indicate example relationships between the specified luminance level and the modified local APL. The bright foreground objects 602, 604, 606, and 608 are of different sizes. The foreground object 602 is the smallest, and the foreground object 604 is the second smallest.

In the shown embodiment, the bright foreground objects 602 and 604 result in greater values of the modified local APLs because the maximum pixel luminance levels $PL_{MAX}$ are large. Further, "boosting" is performed to display the bright foreground objects 602 and 604 because the filtered image local APLs are low. Performing "boosting" facilitates displaying the bright foreground objects 602 and 604, which have small sizes, with high luminance levels as desired. In the embodiment shown in FIG. 13A, the boosting factor is 120% (or 1.2) for the bright foreground object 602 and 105% (or 1.05) for the bright foreground object 604. Meanwhile, when the bright foreground objects 606 and 608, which have large sizes, are displayed, the "boosting" function is disabled, because the filtered image local APLs are high. Accordingly, the specified luminance levels for the bright foreground objects 606 and 608 are equal to the base luminance levels of the bright foreground objects 606 and 608, respectively.

Figure 13B:
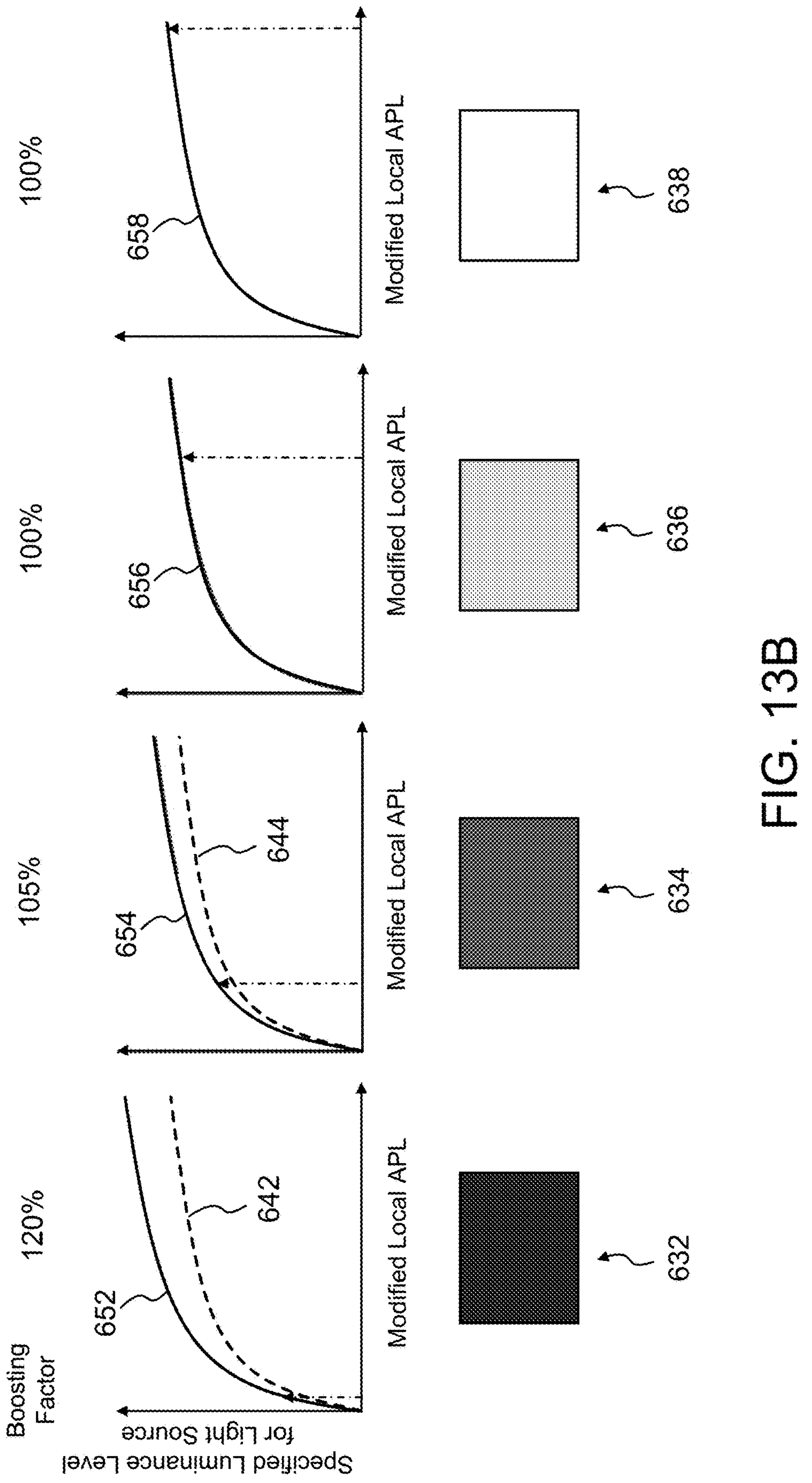
FIG. 13B shows example operations for displaying greyscale images, according to one or more embodiments.

FIG. 13B shows example operations for displaying greyscale images, denoted by numerals 632, 634, 636, and 638, respectively, according to one or more embodiments. The dashed lines 642 and 644 indicate example relationships between the base luminance level and the modified local APL, and the solid lines 652, 654, 656, and 658 indicate example relationships between the specified luminance level and the modified local APL. The greyscale images 632, 634, 636, and 638 have different luminance levels. The greyscale image 632 is the darkest, and the greyscale image 634 is the second darkest.

In the shown embodiment, the greyscale images 632 and 634 result in smaller values of the modified local APLs, because both the maximum pixel luminance levels $PL_{MAX}$ and the filtered image local APLs are low. Although "boosting" is performed on the greyscale images 632 and 634, the specified luminance levels are low due to the smaller values of the modified local APLs. Accordingly, the greyscale images 632 and 634 are displayed with low luminance levels as desired. Meanwhile, the "boosting" function is disabled when the greyscale images 636 and 638 are displayed, because the filtered image local APLs are high. Accordingly, the specified luminance levels for the greyscale images 636 and 638 are equal to the base luminance levels for the greyscale images 636 and 638, respectively.

Figure 14A:
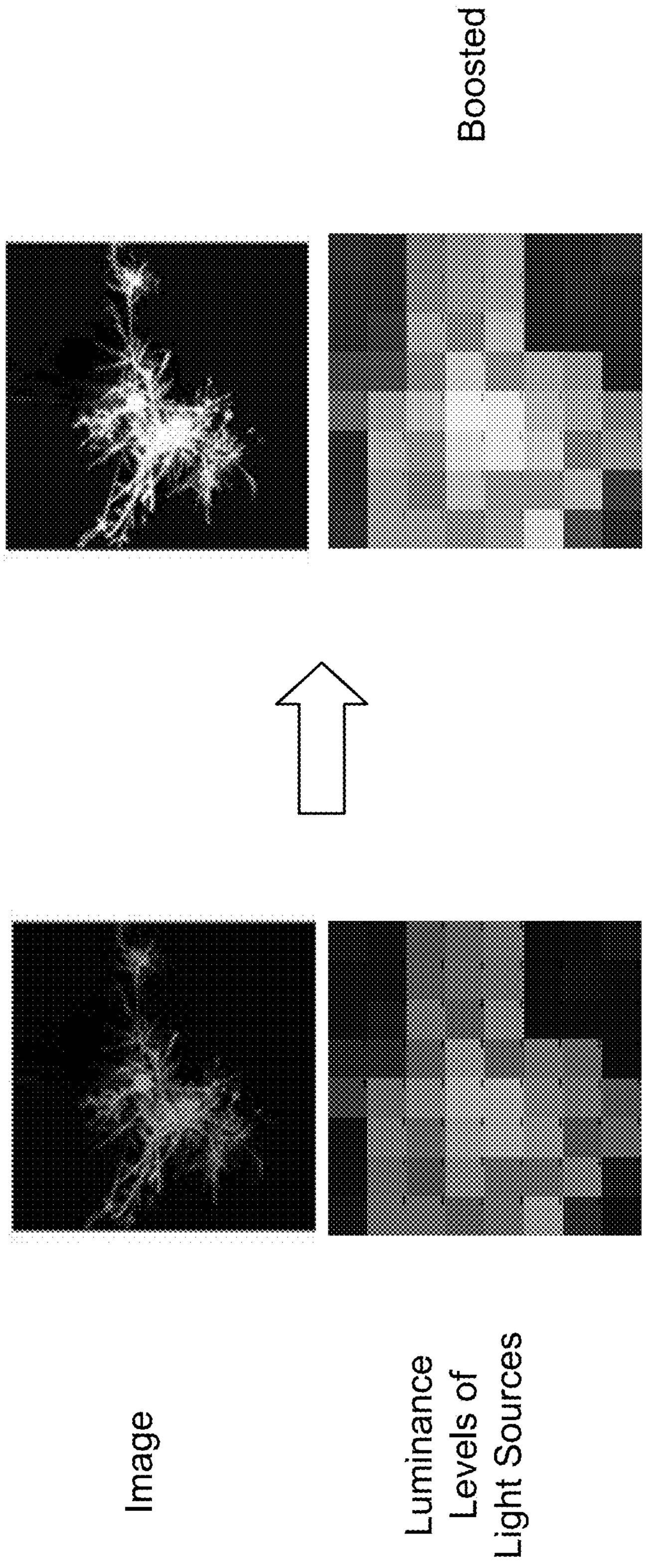
FIG. 14A shows an example image for which a "boosting" function is advantageous, according to one or more embodiments.

FIG. 14A shows an example image for which a "boosting" function is advantageous, according to one or more embodiments. The "boosting" function is advantageous in displaying an image in which bright but small foreground objects, such as an image of firework as shown, are displayed. The "boosting" function allows the bright but small foreground objects to be displayed with the desired high luminance levels.

Figure 14B:
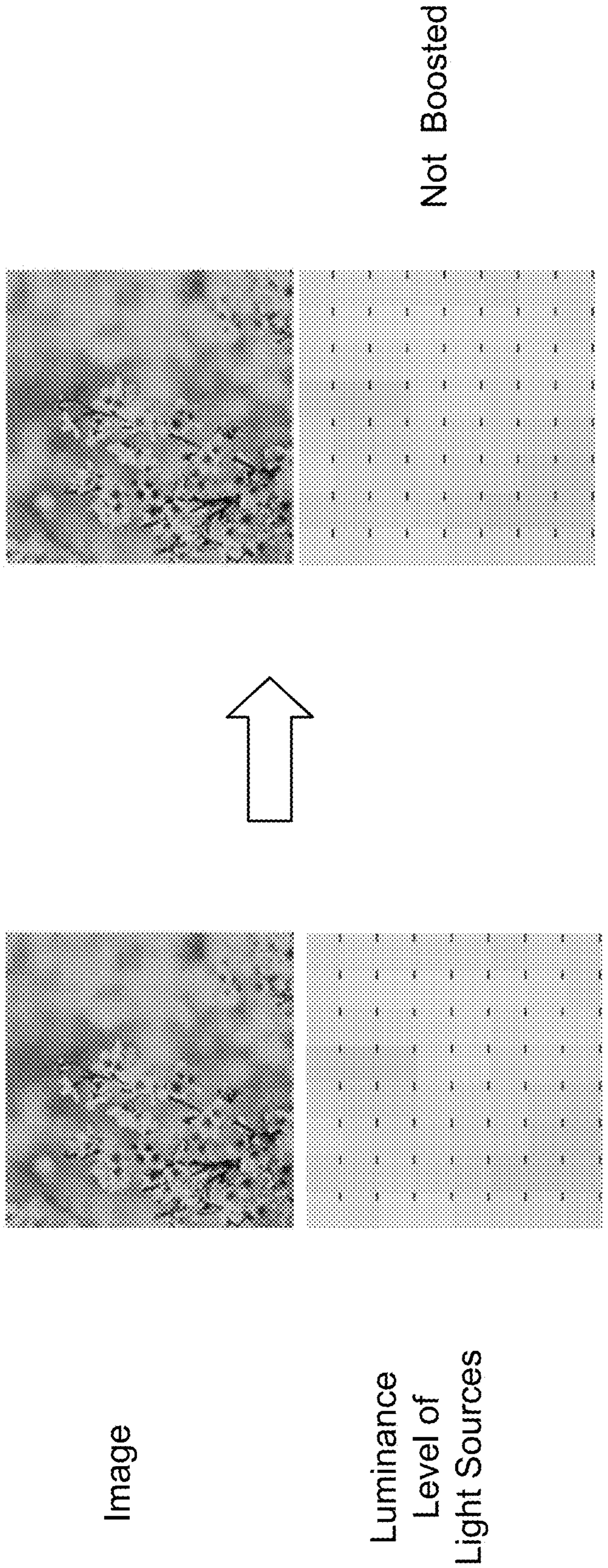
FIG. 14B shows an example image for which the "boosting" function is disabled, according to one or more embodiments.

FIG. 14B shows an example image for which the "boosting" function is disabled, according to one or more embodiments. The "boosting" function does not function when an image with reduced luminance level variations, such as a scenery image, is displayed. When the "boosting" function is disabled, local dimming is performed based on the filtered image local APLs to enhance image contrast.

Figure 15:
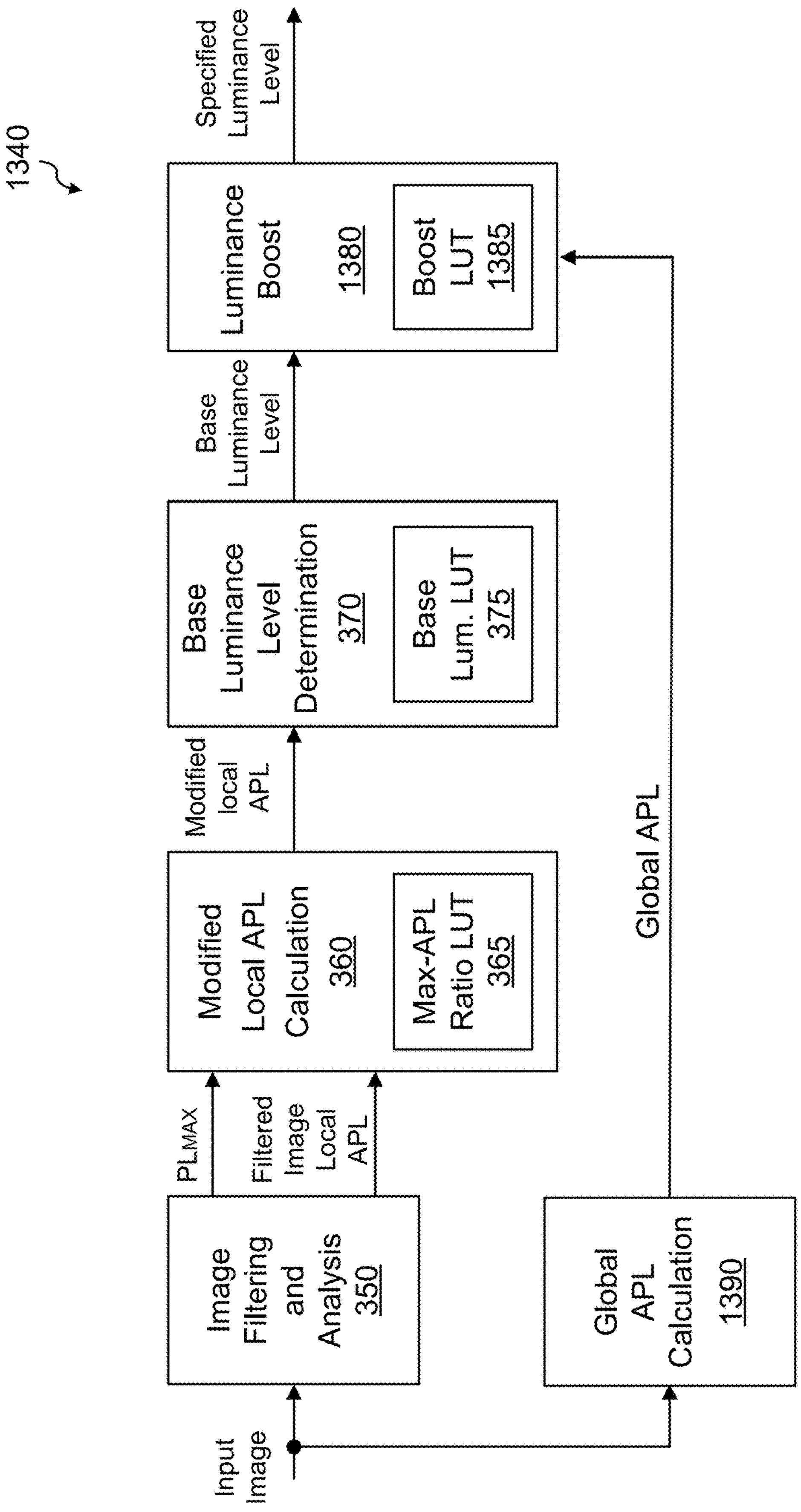
FIG. 15 shows an example configuration of a backlight control circuit, according to other embodiments.

FIG. 15 shows an example configuration of a backlight control circuit 1340, according to other embodiments. The backlight control circuit 1340 is configured similarly to the backlight control circuit 340 shown in FIG. 6, except that the backlight control circuit 1340 includes a luminance boost circuit 1380 instead of the luminance boost circuit 380, and additionally includes a global APL calculation circuit 1390. The global APL calculation circuit 1390 is configured to calculate a global APL, which is the APL (or the average of the pixel luminance levels) of the entire input image. The global APL calculation circuit 1390 is further configured to provide the global APL to the luminance boost circuit 1380.

The luminance boost circuit 1380 is configured to determine the specified luminance level for each light source 410 similarly to the luminance boost circuit 380 shown in FIG. 6 except that the luminance boost circuit 1380 uses the global APL instead of the filtered image local APL. In one or more embodiments, the luminance boost circuit 1380 is configured to determine a boosting factor based on the global APL and apply the boosting factor to the base luminance level for each light source 410. In one implementation, the specified luminance level of each light source 410 may be determined by multiplying the base luminance level by the boosting factor. The luminance boost circuit 1380 may include a boost LUT 1385 that stores information that indicates the relationship between the boosting factor and the global APL. In such embodiments, the luminance boost circuit 1380 may be configured to refer to the boost LUT 1385 to determine the boosting factor. Using the global APL to determine the boosting factor, rather than the filtered image local APLs, would be advantageous for appropriately determining the boosting factor when a bright foreground image with a size larger than the target part of the input image for each light source 410 is displayed on the display panel 200.

Figure 16:
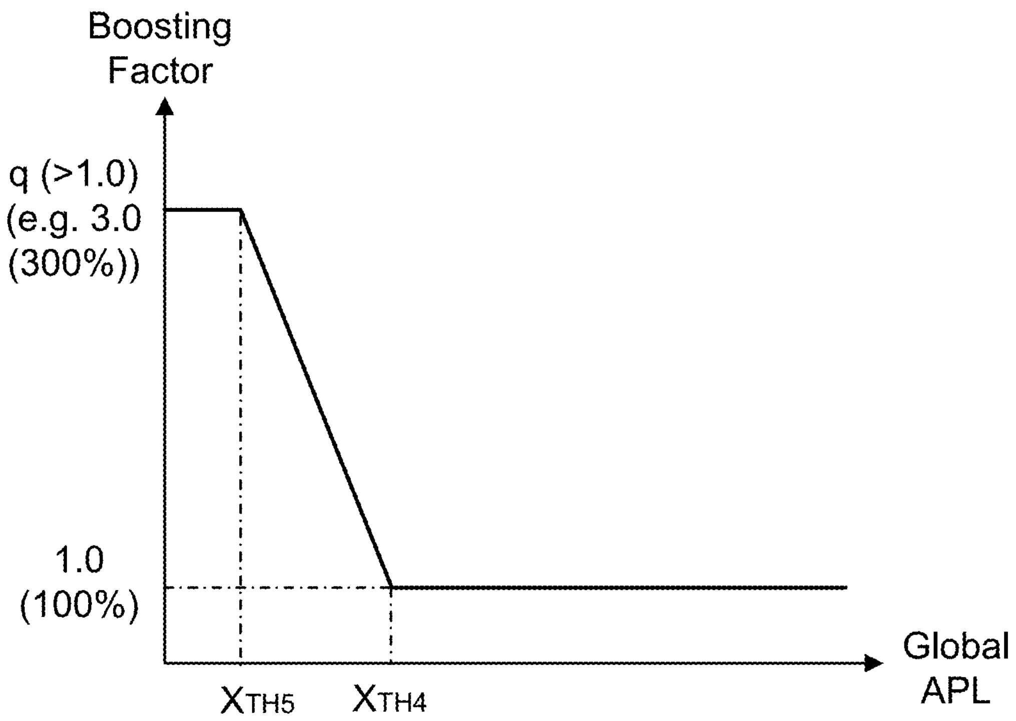
FIG. 16 shows an example relationship between a global APL and a boosting factor, according to one or more embodiments.

FIG. 16 shows an example relationship between the boosting factor and the global APL, according to one or more embodiments. The relationship shown in FIG. 16 may be used in embodiments where the specified luminance level of each light source 410 is determined by multiplying the base luminance level for each light source 410 by the boosting factor. In the shown embodiment, the boosting factor is 1.0 (or 100%) when the global APL is greater than or equal to the threshold $X_{TH4}$ (i.e., "boosting" is not performed), and is greater than 1.0 (or greater than 100%) when the global APL is less than the threshold $X_{TH4}$ (i.e., "boosting" is performed). More specifically, the boosting factor is the maximum value q (or 100q %) when the global APL is less than or equal to a threshold $X_{TH5}$, where q is a value greater than 1.0. In one implementation, the maximum value q may be 3.0 (or 300%). In other implementations, the maximum value q may be a different value greater than 1.0. When the global APL is in the range between the thresholds $X_{TH5}$ and $X_{TH4}$, the boosting factor decreases from q to 1.0 as the global APL increases. While FIG. 16 shows that the boosting factor linearly decreases from q to 1.0, the boosting factor may non-linearly decrease.

Figure 17:
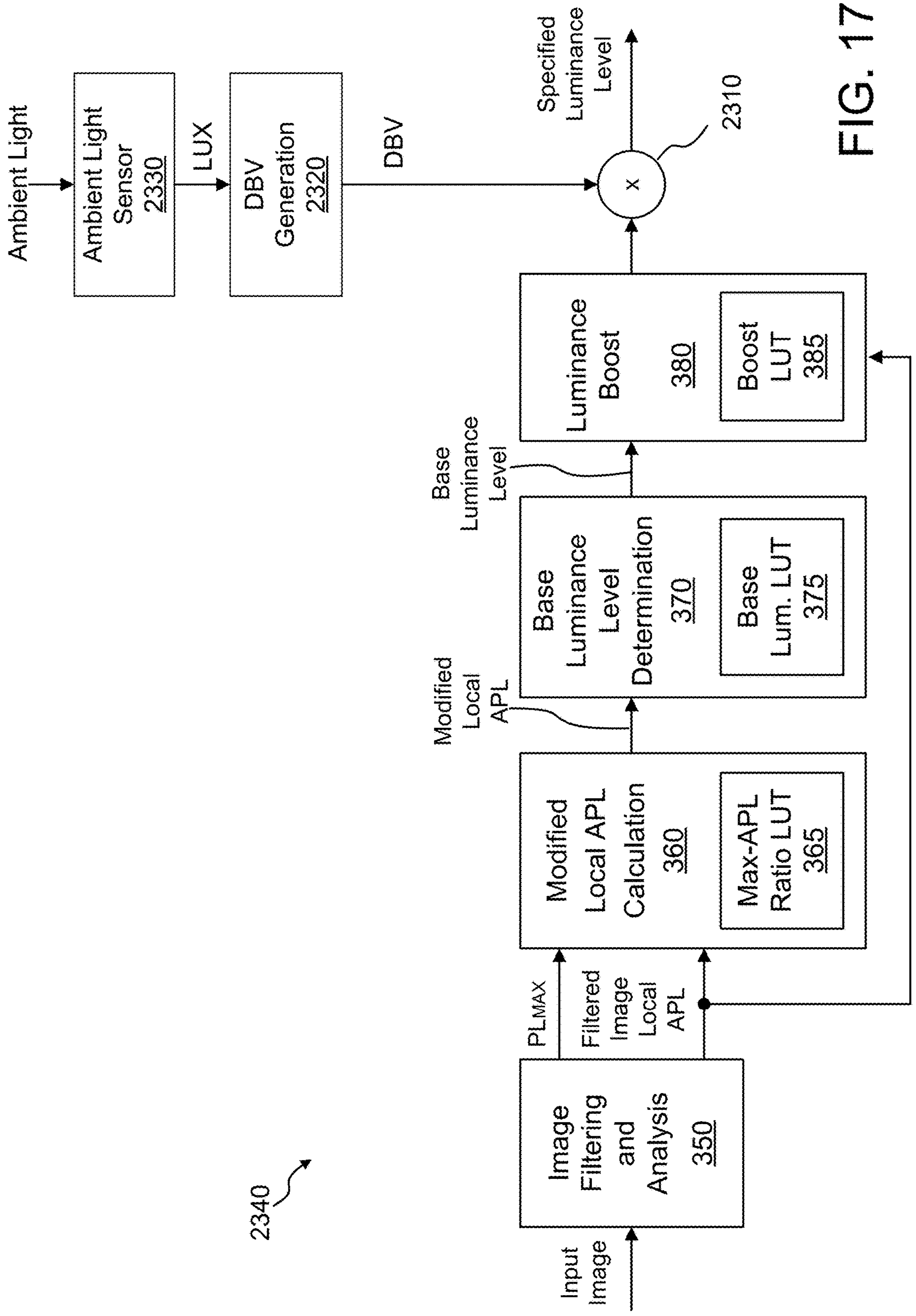
FIG. 17 is an example configuration of a backlight control circuit, according to still other embodiments.

FIG. 17 is an example configuration of a backlight control circuit 2340, according to still other embodiments. The backlight control circuit 2340 is configured similarly to the backlight control circuit 340 shown in FIG. 6, except that the backlight control circuit 2340 further includes a luminance adjustment circuit 2310 configured to adjust the specified luminance level for each light source 410 based on a display brightness value (DBV). The DBV referred to herein is a value that specifies a desired display brightness level of the display device 1000, wherein the display brightness level referred to herein is the overall brightness level of the display image displayed on the display panel 200. In the shown embodiment, the backlight control circuit 2340 further includes a DBV generation circuit 2320 configured to determine the DBV based on the ambient light luminance level LUX measured by an ambient light sensor 2330. In other embodiments, the DBV may be generated by a controller external to the display driver 300. The DBV may be generated based on a user operation in addition to the ambient light luminance level LUX. For example, when an instruction to adjust the display brightness level of the display device 1000 is manually input to an input device, the DBV may be generated based on this instruction.

Figure 18A:
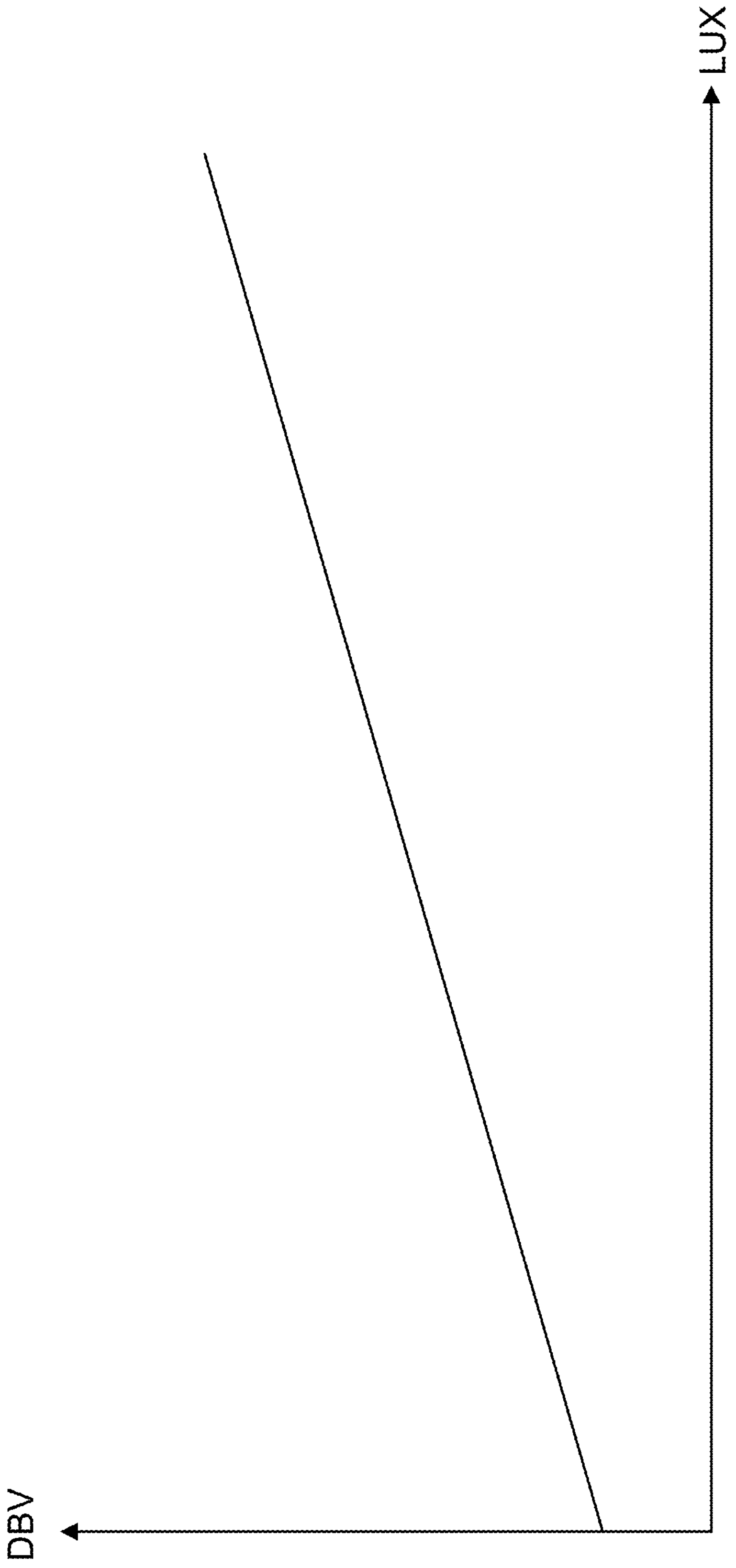
FIG. 18A shows an example relationship between the ambient light luminance level and a display brightness value (DBV), according to one or more embodiments.

FIG. 18A shows an example relationship between the ambient light luminance level LUX and the DBV, according to one or more embodiments. In the shown embodiment, the DBV increases monotonically as the ambient light luminance level LUX increases. While FIG. 18A shows that the DBV increases linearly as the ambient light luminance level LUX increases, the DBV may increase non-linearly as the ambient light luminance level LUX increases.

Figure 18B:
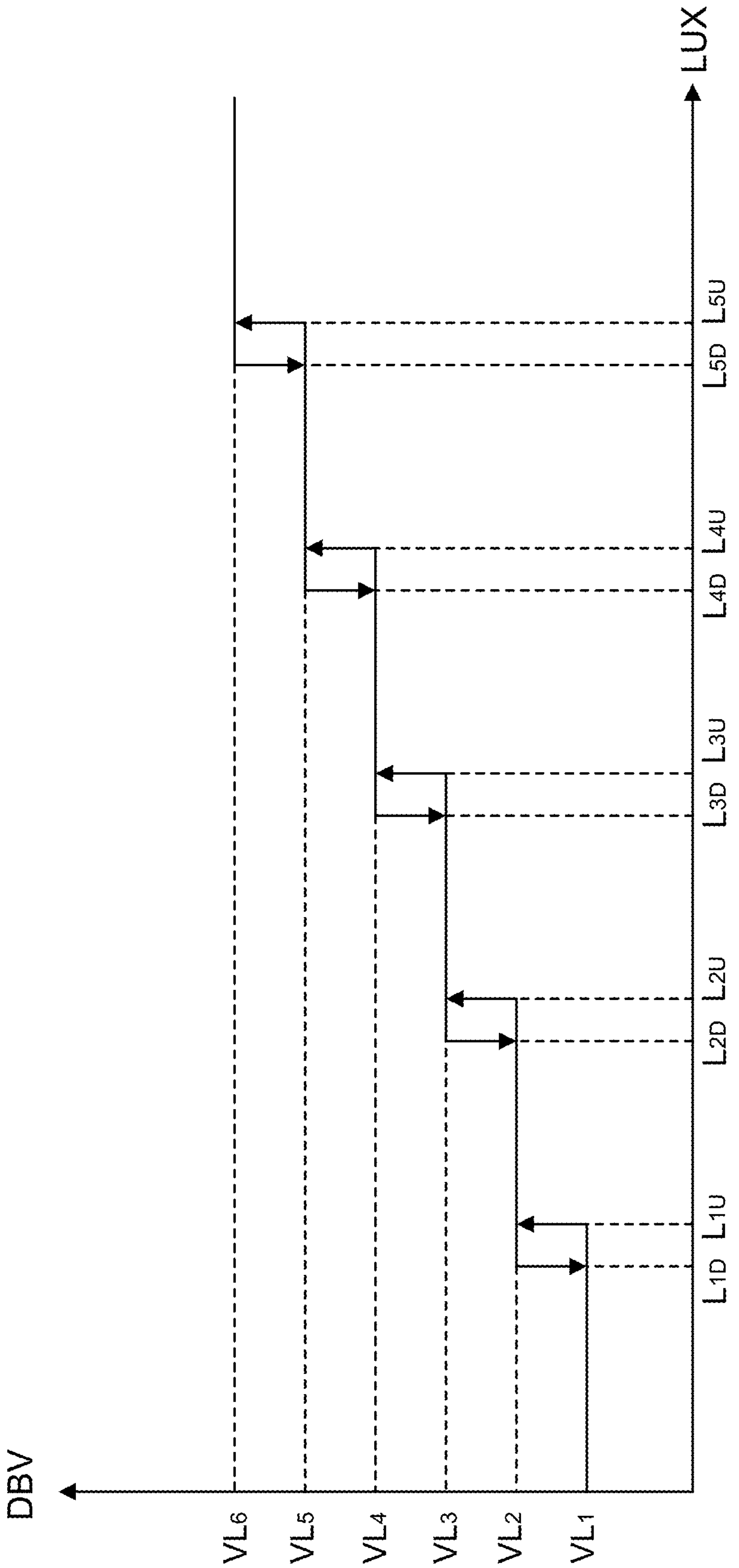
FIG. 18B shows another example relationship between the ambient light luminance level and the DBV, according to one or more embodiments.

FIG. 18B shows another example relationship between the ambient light luminance level LUX and the DBV, according to one or more embodiments. In one or more embodiments, the DBV increases stepwisely as the ambient light luminance level LUX increases. In the shown embodiment, the DBV has a hysteretic dependence on the ambient light luminance level LUX. More specifically, the DBV increases from $VL_1$ to $VL_2$ at an ambient light luminance level $L_{1U}$ while the DBV decreases from $VL_2$ to $VL_1$ at an ambient light luminance level $L_{1D}$ lower than the ambient light luminance level $L_{1U}$. Similarly, for j between 2 and 5, inclusive, the DBV increases from $VL_j$ to $VL_{j+1}$ at an ambient light luminance level $L_{jU}$ while the DBV decreases from $VL_{j+1}$ to $VL_j$ at an ambient light luminance level $L_{jD}$ lower than the ambient light luminance level $L_{jU}$.

Referring back to FIG. 17, the backlight control circuit 2340 may be configured to generate the specified luminance level for each light source 410 by modifying the base luminance level for each light source 410 by the luminance boost circuit 380 and the luminance adjustment circuit 2310. In one or more embodiments, the luminance boost circuit 380 may be configured to determine a boosting factor based on the filtered image local APL for each light source 410, and the luminance adjustment circuit 2310 may be configured to determine a luminance adjustment factor based on the DBV. The boosting factor may be determined with reference to the boost LUT 385 as described in relation to FIGS. 6 and 12. The luminance adjustment factor may be determined such that the luminance adjustment factor increases as the DBV increases. The backlight control circuit 2340 may be configured to generate the specified luminance level for each light source 410 by applying the boosting factor and the luminance adjustment factor to the base luminance level for each light source 410. In one implementation, the backlight control circuit 2340 may be configured to generate the specified luminance level for each light source 410 by multiplying the base luminance level for each light source 410 by the boosting factor and further multiplying the result by the luminance adjustment factor. Using the boosting factor to determine the specified luminance level achieves the "boosting" function as discussed above in relation to FIGS. 6 and 12. Using the luminance adjustment factor to determine the specified luminance level allows the display brightness level of the panel display device to be adjusted to improve the visibility of the image displayed on the display panel 200. In particular, in implementations where the DBV is determined based on the ambient light luminance level LUX, using the luminance adjustment factor determined based on the DBV allows the display brightness level of the panel display device to be appropriately adjusted in light of the ambient light luminance level LUX.

Figure 19:
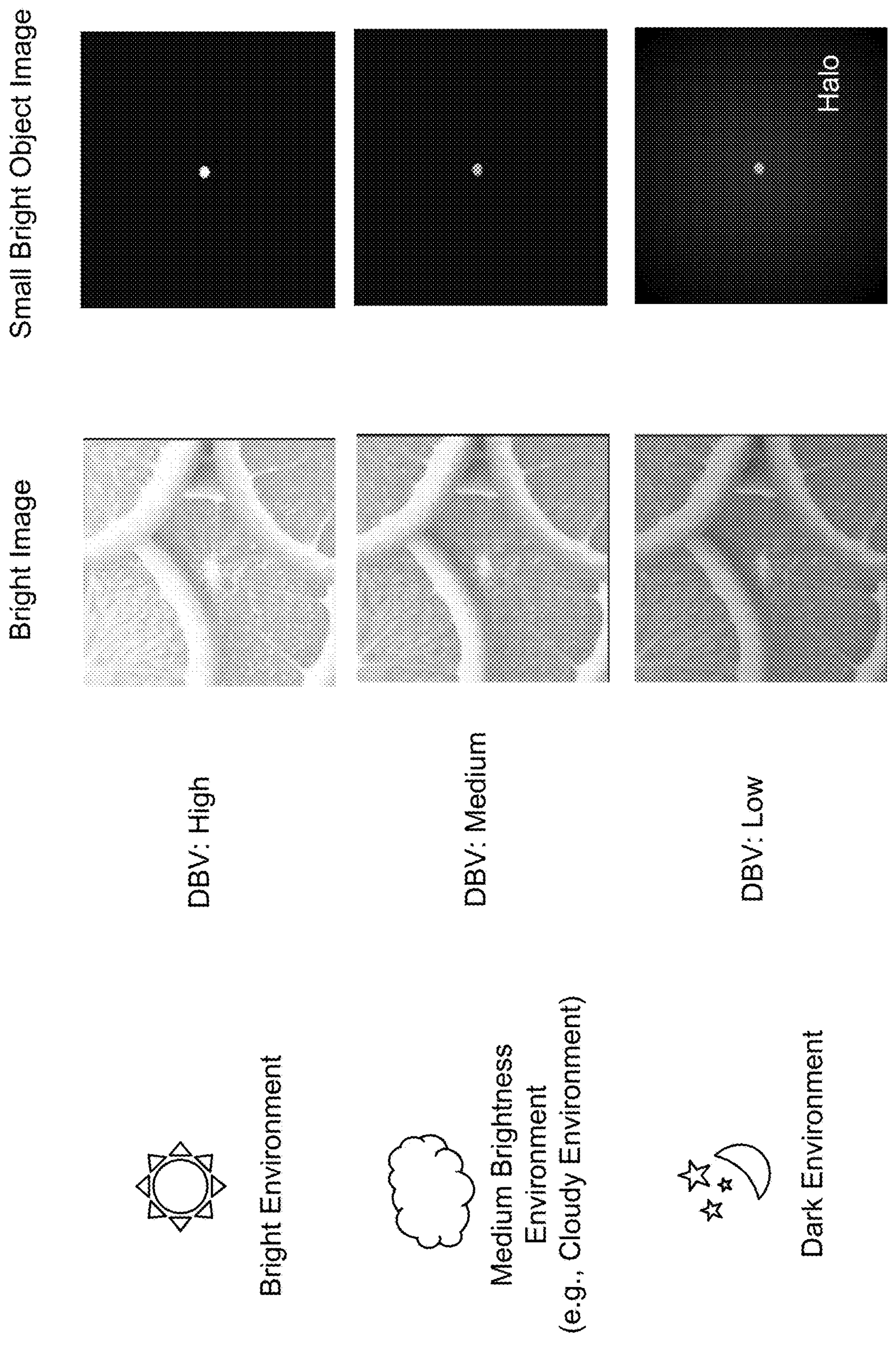
FIG. 19 shows an example of controlling a DBV in response to the environment in which the panel display device is used, according to one or more embodiments.

FIG. 19 shows an example of controlling the DBV in response to the environment in which the panel display device is used, according to one or more embodiments. In a bright environment (e.g., a sunny environment), the DBV is determined to be a "high" value in response to the ambient light luminance level LUX being high. In a medium brightness environment (e.g., a cloudy environment), the DBV is determined to be a "medium" value lower than the "high" value in response to the ambient light luminance level LUX being medium. In a dark environment (e.g., a night environment), the DBV is determined to be a "low" value lower than the "medium" value in response to the ambient light luminance level LUX being low.

The specified luminance levels of the respective light sources 410 are adjusted depending on the DBV to adjust the display brightness level of the panel display device depending on the ambient light luminance level LUX. In the bright environment, the specified luminance levels of the respective light sources 410 are increased in response to an increase in the DBV to display an image at an increased display brightness level. In the dark environment, the specified luminance levels of the respective light sources 410 are decreased in response to a decrease in the DBV to display an image at a decreased display brightness level.

Further, when a small bright foreground object is displayed on a dark background image, specified luminance levels of one or more light sources 410 that illuminate the area of the display panel 200 in which the small bright foreground object is displayed are increased. This may however cause a halo effect (or halation) when the display device is used in a dark environment, because the light emitted from the one or more light sources 410 may bleed into the surrounding area of the small bright foreground object and human vision is sensitive to the bleeding light in the dark environment.

The halo effect may be undesirably enhanced when the "boosting" function, which facilitates displaying the small bright foreground object at a desired high luminance level as described in relation to FIG. 14A, is performed. The boosting function increases the luminance levels of one or more light sources that illuminate the area in which the small bright foreground object is displayed, which may increase the bleeding of light into the surrounding area of the small bright foreground object to enhance the halo effect. The following describes embodiments for mitigating the halo effect which may occur when a small bright foreground object is displayed on a dark background image in a dark environment.

Figure 20:
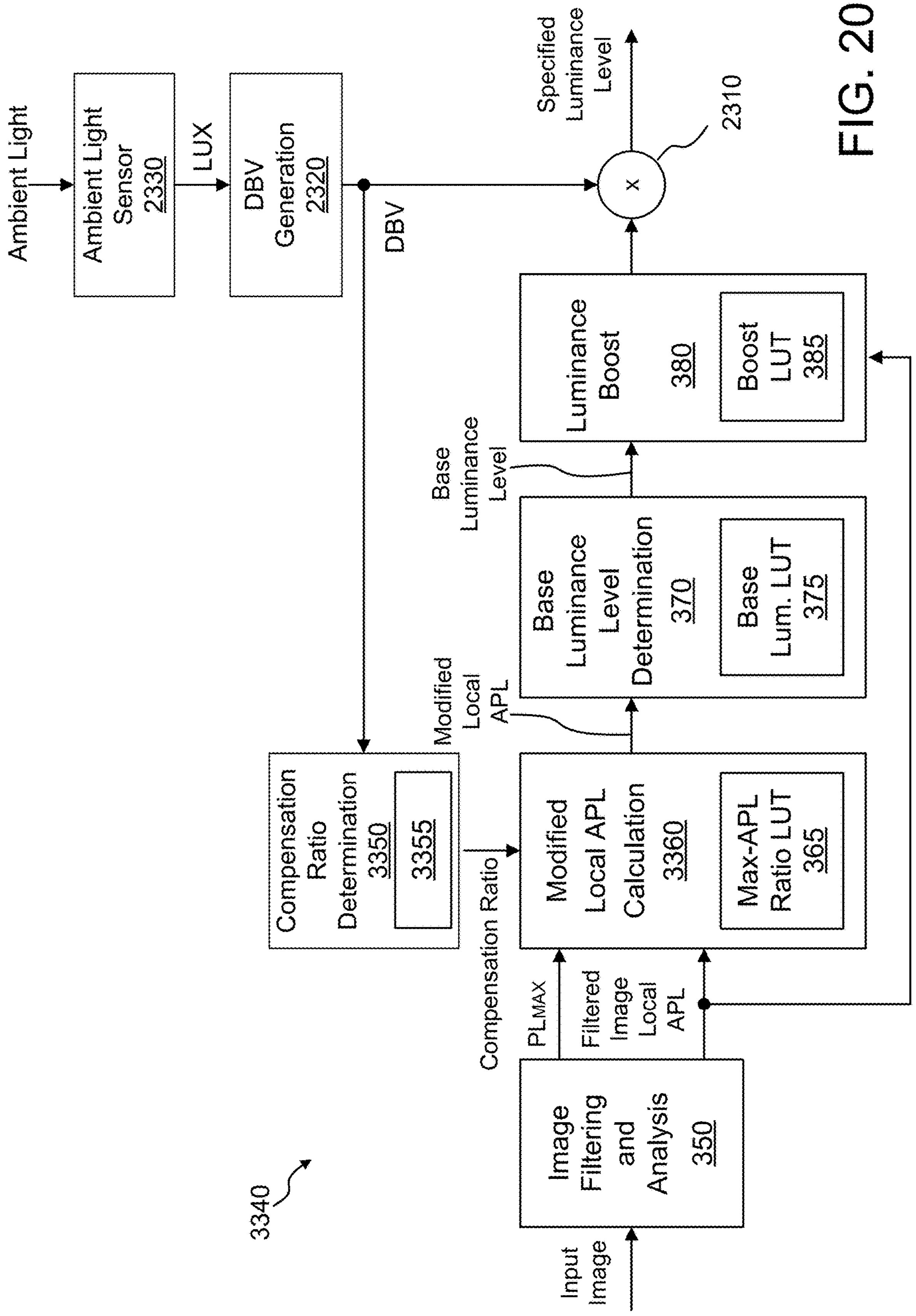
FIG. 20 shows an example configuration of a backlight control circuit, according to still other embodiments.

FIG. 20 shows an example configuration of a backlight control circuit 3340, according to still other embodiments. The backlight control circuit 3340 is configured similarly to the backlight control circuit 2340 shown in FIG. 17, except that the backlight control circuit 3340 includes a compensation ratio determination circuit 3350 and a modified local APL calculation circuit 3360 instead of the modified local APL calculation circuit 360.

The compensation ratio determination circuit 3350 is configured to determine a compensation ratio based on the DBV received from the DBV generation circuit 2320. As discussed in more detail later, the compensation ratio is used to suppress luminance levels of one or more light sources 410 that illuminate the area of the display panel 200 in which the small bright foreground object is displayed when the display device is used in a dark environment. In one implementation, the compensation ratio determination circuit 3350 may include a compensation ratio LUT 3355 that contains information that indicates the relationship between the DBV and the compensation ratio and may be configured to refer to the compensation ratio LUT 3355 to determine the compensation ratio based on the DBV. The compensation ratio is provided to the modified local APL calculation circuit 3360.

Figure 21:
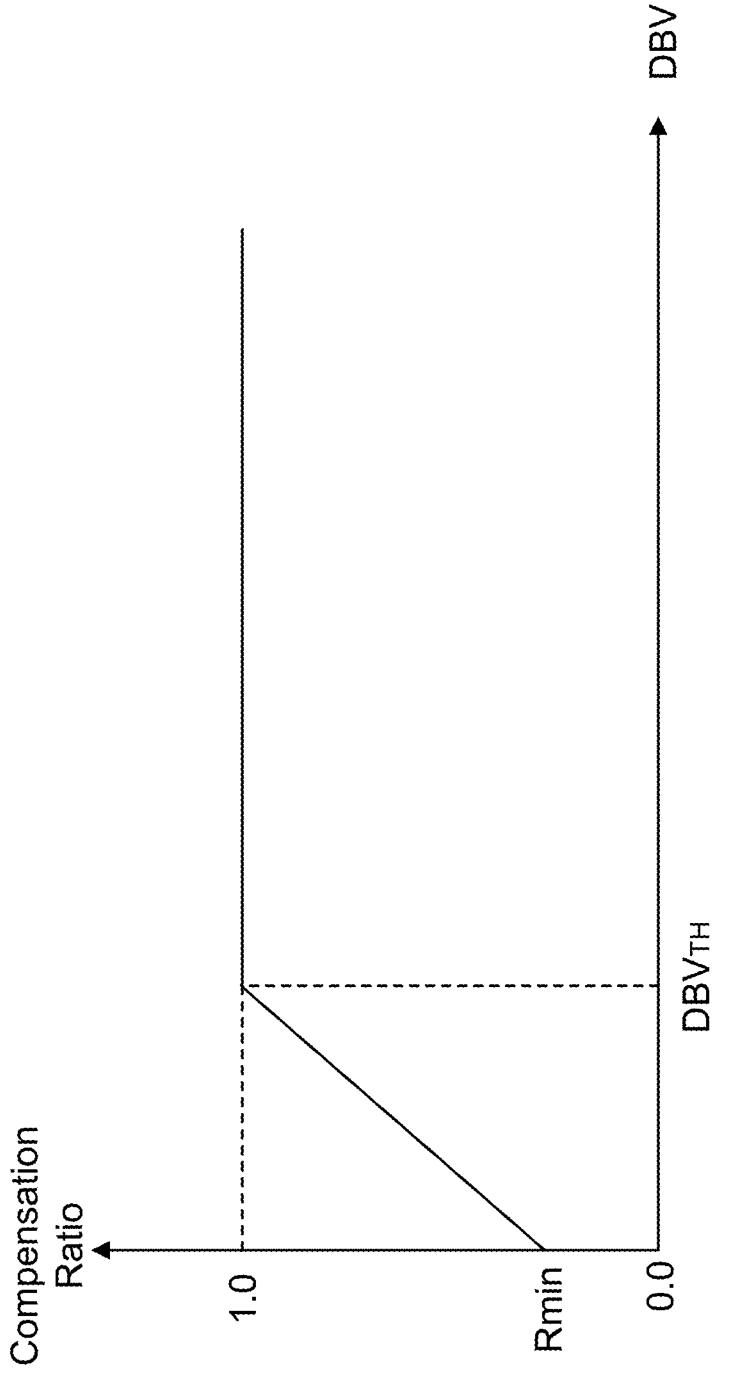
FIG. 21 shows an example relationship between a DBV and a compensation ratio, according to one or more embodiments.

FIG. 21 shows an example relationship between the DBV and the compensation ratio, according to one or more embodiments. In the shown embodiment, the compensation ratio increases as the DBV increases when the DBV is less than a threshold value $DBV_{TH}$, and the compensation ratio is fixed to 1.0 when the DBV is greater than or equal to the threshold value $DBV_{TH}$. While FIG. 21 shows that the compensation ratio increases linearly as the DBV increases when the DBV is less than the threshold value $DBV_{TH}$, the compensation ratio may increase non-linearly. Of course, the disclosed embodiments contemplate that the compensation ratio may be fixed at a value other than 1.0 when the DBV is greater than or equal to the threshold value $DBV_{TH}$.

Referring back to FIG. 20, the modified local APL calculation circuit 3360 is configured to receive the compensation ratio from the compensation ratio determination circuit 3350 and to determine a modified local APL as a weighted average of the maximum pixel luminance level $PL_{MAX}$ and the filtered image local APL of the filtered image part generated for each light source 410, while using the compensation ratio to modify the weight assigned to the maximum pixel luminance level $PL_{MAX}$ in determining the modified local APL. In some embodiments, the modified local APL calculation circuit 3360 may be configured to determine the weight assigned to the maximum pixel luminance level $PL_{MAX}$ based on the filtered image local APL using the max-APL ratio LUT 365 as described in relation to FIG. 10, and to modify the weight thus determined for the maximum pixel luminance level $PL_{MAX}$ based on the compensation ratio. The resulting weight for the maximum pixel luminance level $PL_{MAX}$ may be referred to hereinafter as the compensated weight for the maximum pixel luminance level $PL_{MAX}$. In one implementation, the modified local APL calculation circuit 3360 may be configured to calculate the compensated weight for the maximum pixel luminance level $PL_{MAX}$ by multiplying the weight originally assigned to the maximum pixel luminance level $PL_{MAX}$ by the compensation ratio. The modified local APL calculation circuit 3360 may further be configured to determine the compensated weight for the filtered image local APL by subtracting the compensated weight for the maximum pixel luminance level $PL_{MAX}$ from 1.0. The modified local APL calculation circuit 3360 may be further configured to determine the modified local APL as a weighted average of the maximum pixel luminance level $PL_{MAX}$ and the filtered image local APL based on the compensated weights determined for the maximum pixel luminance level $PL_{MAX}$ and the filtered image local APL.

Figure 22A:
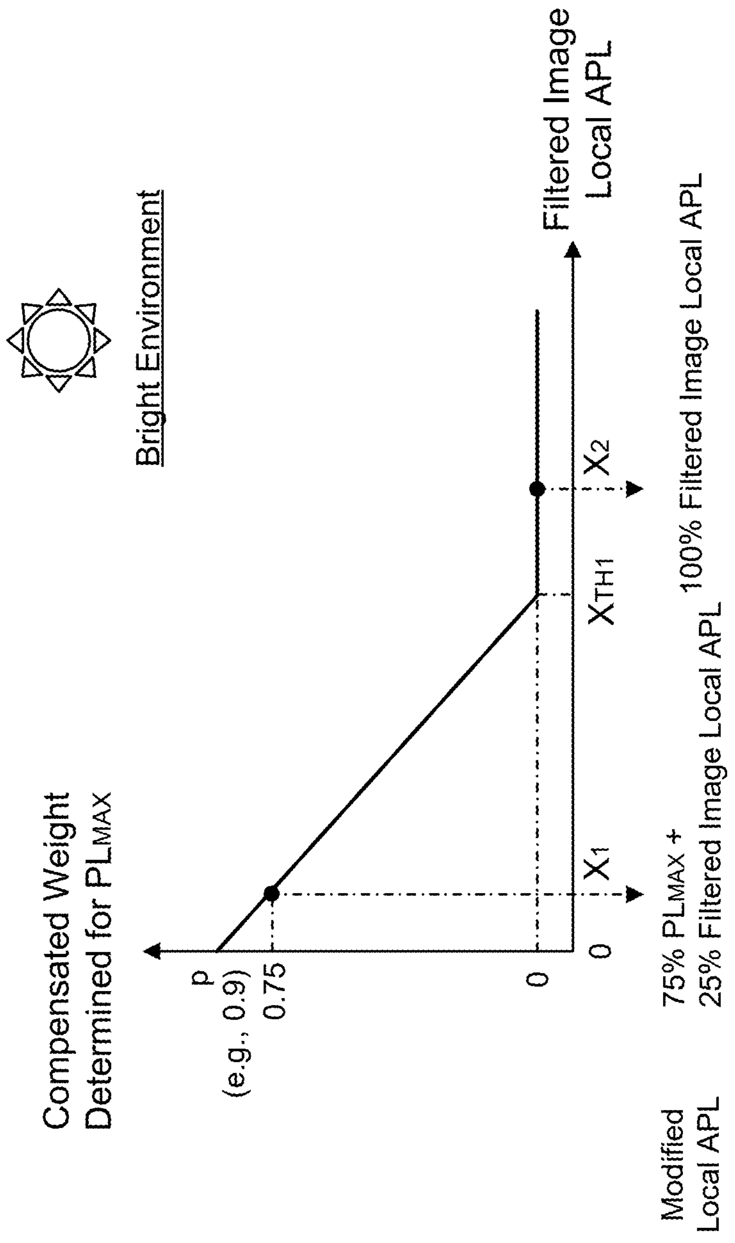
FIG. 22A shows an example of the relationship between a compensated weight for a maximum pixel luminance level and a filtered image local APL when a panel display device is used in a bright environment, according to one or more embodiments.

FIG. 22A shows an example of the relationship between the compensated weight for the maximum pixel luminance level $PL_{MAX}$ and the filtered image local APL when the panel display device is used in a bright environment, according to one or more embodiments. In embodiments where the DBV is determined based on the ambient light luminance level LUX, the DBV may be more than the threshold value $DBV_{TH}$ when the display device is used in a bright environment. In this case, the compensation ratio may be determined to be 1.0 (see FIG. 21) and the compensated weight determined for the maximum pixel luminance level $PL_{MAX}$ may be determined to be equal to the weight originally assigned to the maximum pixel luminance level $PL_{MAX}$.

Figure 22B:
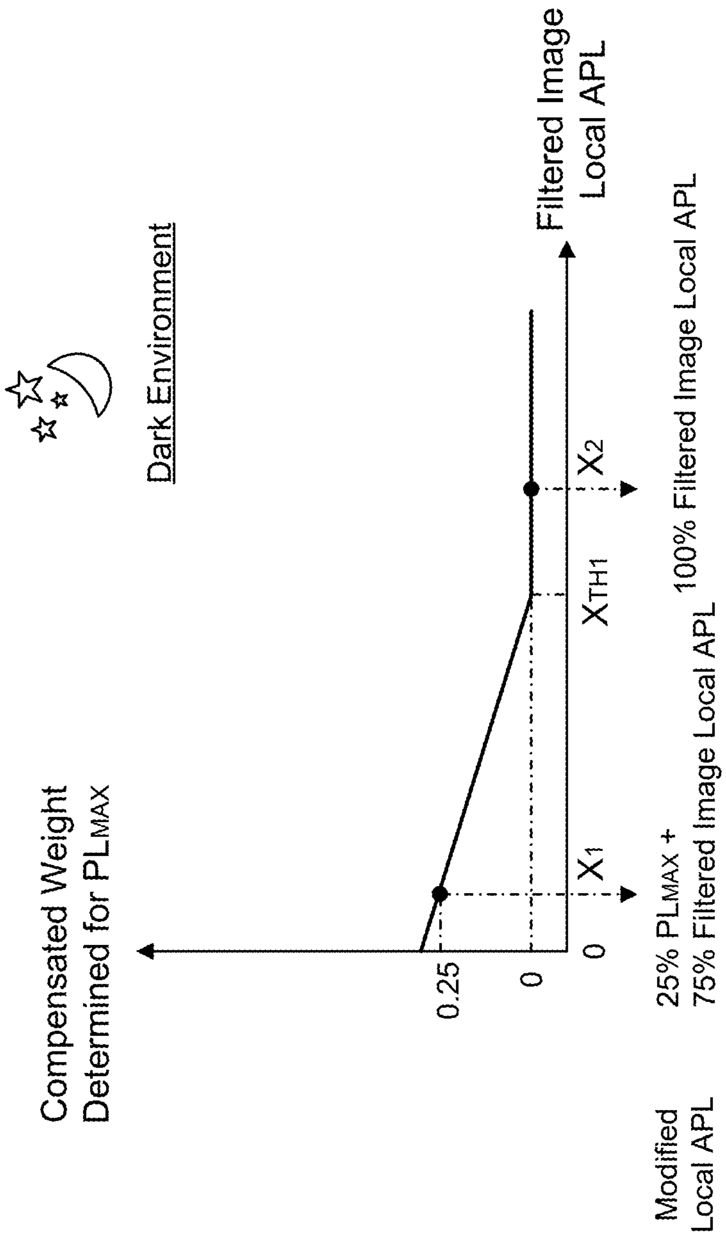
FIG. 22B shows an example of the relationship between a compensated weight for a maximum pixel luminance level and a filtered image local APL when a panel display device is used in a dark environment, according to one or more embodiments.

FIG. 22B shows an example of the relationship between the compensated weight for the maximum pixel luminance level $PL_{MAX}$ and the filtered image local APL when the panel display device is used in a dark environment, according to one or more embodiments. In embodiments where the DBV is determined based on the ambient light luminance level LUX, the DBV may be less than the threshold value $DBV_{TH}$ when the display device is used in a dark environment. In this case, the weight originally assigned to the maximum pixel luminance level $PL_{MAX}$ is modified based on a compensation ratio, and thereby the compensated weight determined for the maximum pixel luminance level $PL_{MAX}$ is determined to be smaller than the weight originally assigned to the maximum pixel luminance level $PL_{MAX}$. This effectively suppresses the halo effect that potentially occurs when a small bright foreground object is displayed on a dark background image, because the maximum pixel luminance level $PL_{MAX}$ is a parameter that determines the luminance levels of one or more light sources 410 that illuminate the area of the display panel 200 in which a small bright foreground object is displayed.

Figure 23:
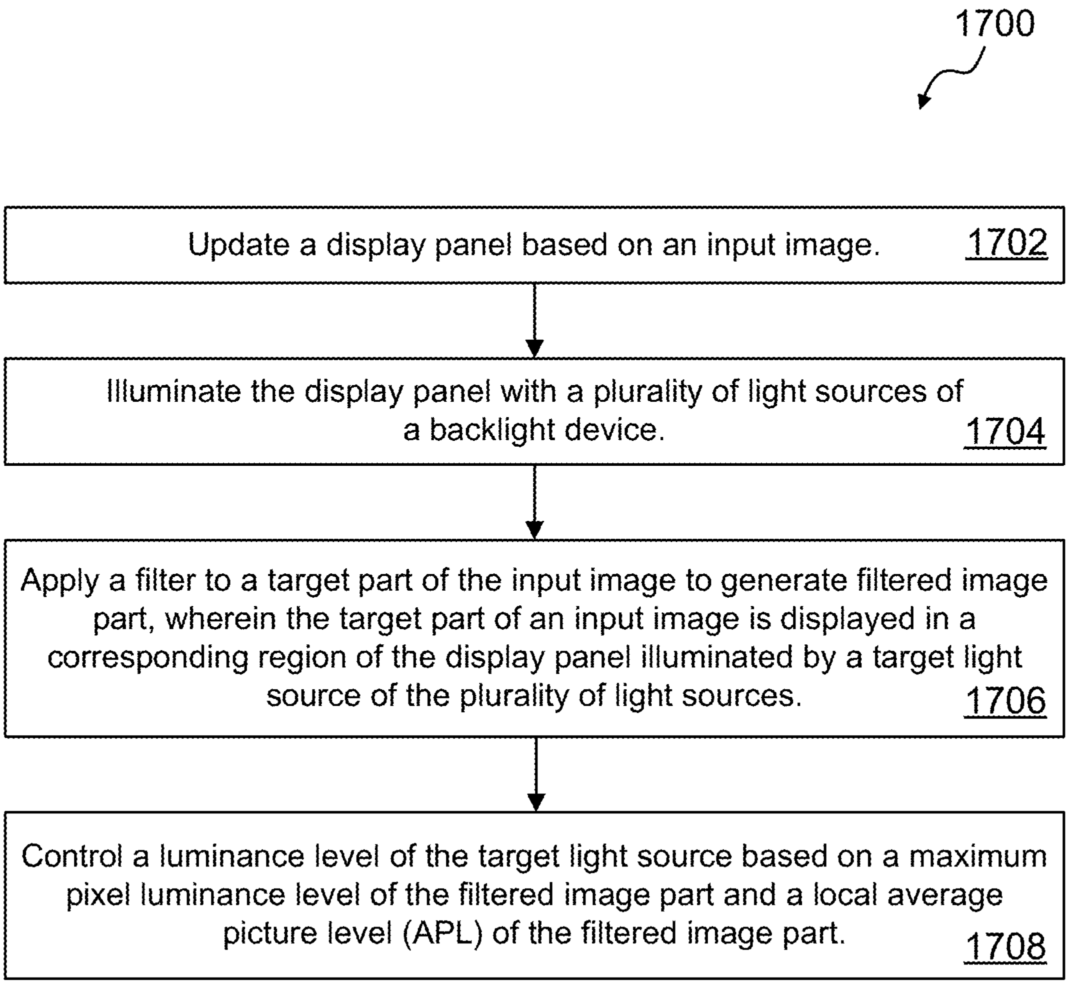
FIG. 23 is a flowchart of an exemplary process for controlling a light source of a backlight device, according to one or more embodiments.
Figure 10:
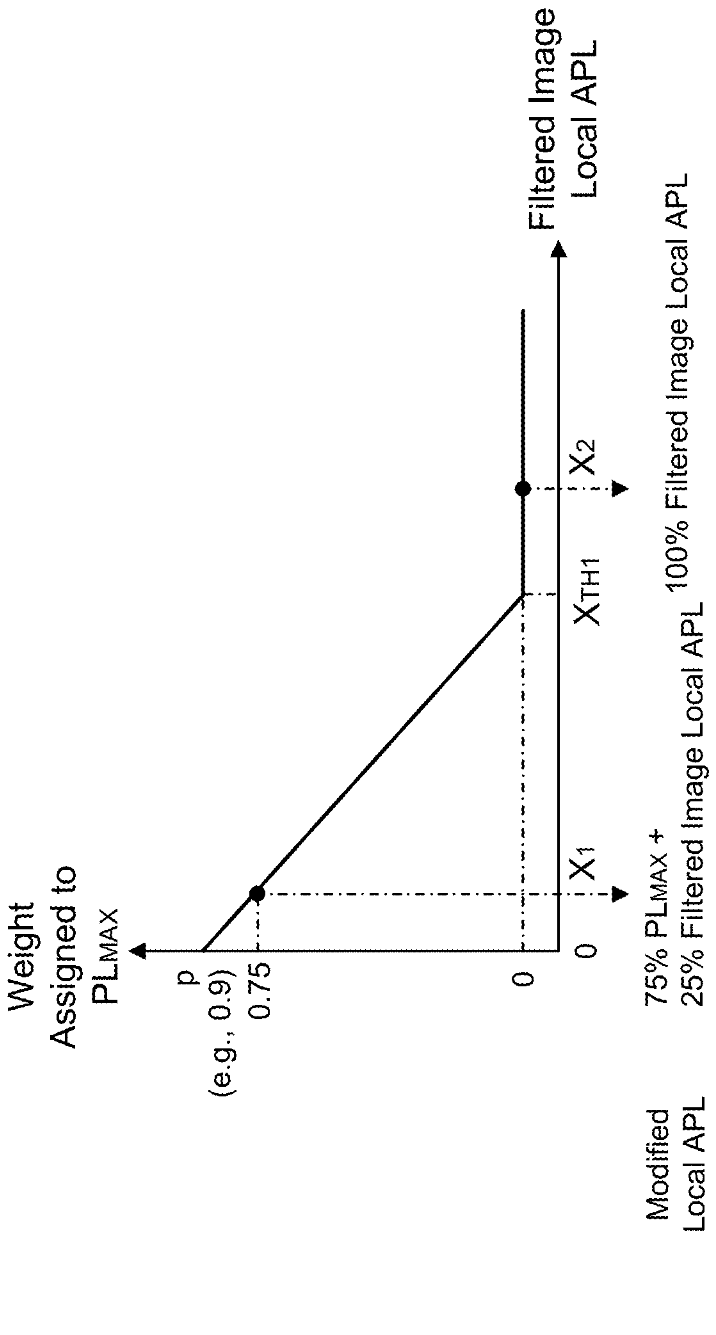
Figure 22A:
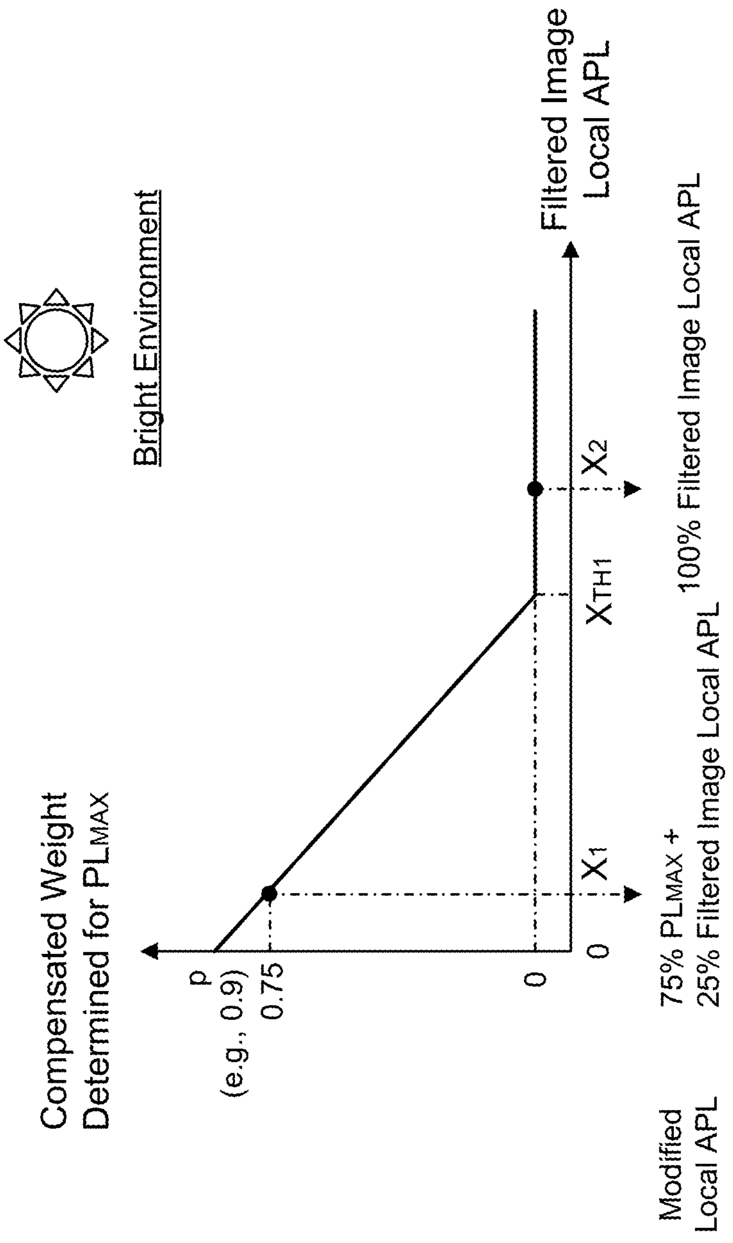
Figure 22B:
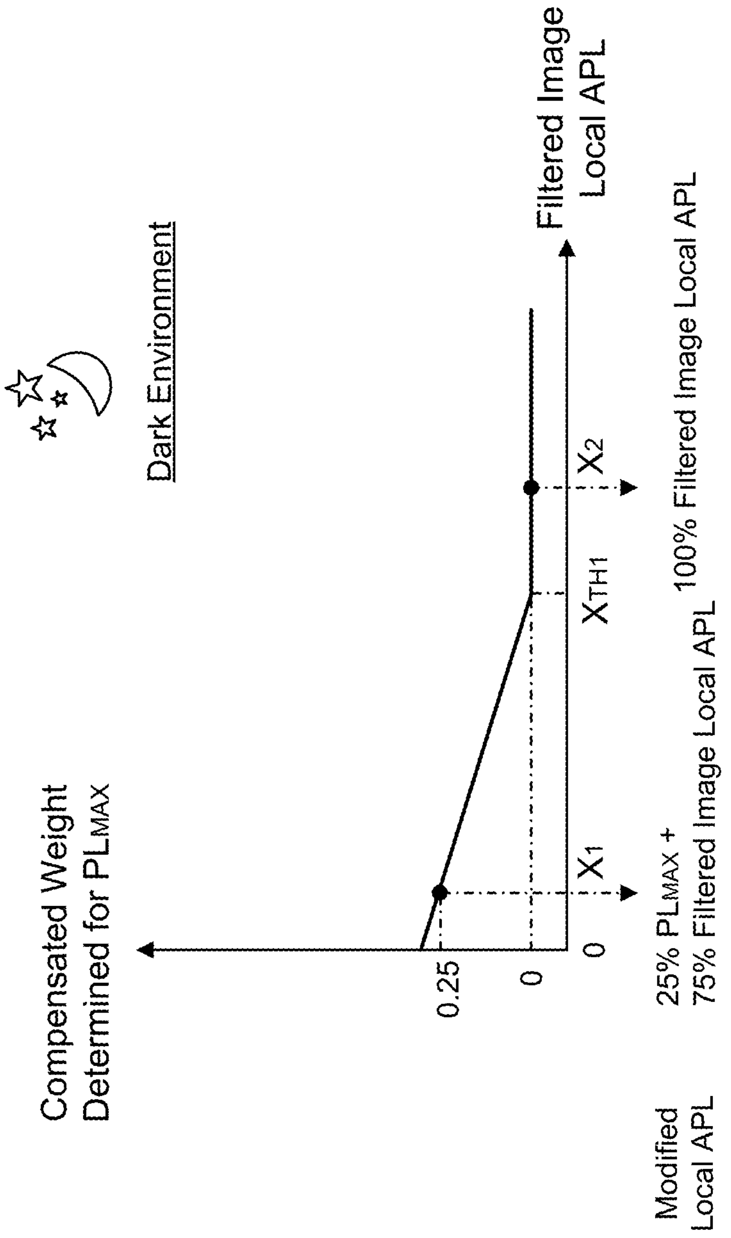

FIG. 23 is a flowchart of an exemplary process 1700 for controlling a light source of a backlight device, according to one or more embodiments. The process 1700 may be performed by the display device 1000 shown in FIGS. 2 and 3, and in particular by the display driver 300 shown in FIG. 5. However, it will be recognized that a display device that includes additional and/or fewer components as shown in FIGS. 2 and 3 may be used to perform the process 1700, that any of the following steps may be performed in any suitable order, and that the process 1700 may be performed in any suitable environment.

In one or more embodiments, the process 1700 includes updating a display panel (e.g., the display panel 200 shown in FIGS. 2, 3, and 5) based on an input image at step 1702. The process 1700 further includes illuminating the display panel with a plurality of light sources (e.g., the light sources 410 shown in FIGS. 2 and 3) of a backlight device (e.g., the backlight device 400 shown in FIGS. 2, 3, and 5) at step 1704. The process 1700 further includes applying a filter to a target part of the input image to generate a filtered image part at step 1706. The target part of an input image is displayed in a corresponding region (e.g., the regions **420*a* and 420*c* shown in FIG. 7A) of the display panel illuminated by a target light source of the plurality of light sources. The process 1700 further includes controlling a luminance level of the target light source based on a maximum pixel luminance level of the filtered image part and a local average picture level (APL) of the filtered image part at step 1708**.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display device, comprising:

a backlight device comprising a plurality of light sources configured to illuminate a display panel; and a backlight control circuit configured to:

apply a filter to a target part of an input image to generate a filtered image part, wherein the target part of the input image is displayed in a corresponding region of the display panel illuminated by a target light source of the plurality of light sources; and control a luminance level of the target light source based on a maximum pixel luminance level of the filtered image part and a local average picture level (APL) of the filtered image part.

2. The display device of claim 1, wherein the filter comprises filter coefficients assigned to respective pixels of the target part of the input image, wherein applying the filter to the target part of the input image comprises applying the filter coefficients to pixel luminance levels of the pixels of the target part of the input image, and wherein the filter coefficients are defined depending on respective distances between the pixels of the target part of the input image and a corresponding position of the target light source in the input image.

3. The display device of claim 1, wherein controlling the luminance level of the target light source comprises:

calculating a modified local APL as a weighted average of the maximum pixel luminance level of the filtered image part and the local APL of the filtered image part; and determining the luminance level of the target light source based on the modified local APL.

4. The display device of claim 3, wherein calculating the modified local APL comprises:

determining a weight assigned to the maximum pixel luminance level; and calculating the weighted average using the determined weight.

5. The display device of claim 4, wherein determining the weight assigned to the maximum pixel luminance level is based on the local APL of the filtered image part.

6. The display device of claim 4, wherein determining the weight assigned to the maximum pixel luminance level is further based on a display brightness level (DBV) of the display device.

7. The display device of claim 6, further comprising:

an ambient light sensor configured to measure an ambient light luminance level, wherein the DBV is determined based on the ambient light luminance level.

8. The display device of claim 3, wherein determining the luminance level of the target light source based on the modified local APL comprises:

determining a base luminance level based on the modified local APL;

determining a boosting factor determined based on the local APL of the filtered image part; and determining the luminance level of the target light source based on the base luminance level and the boosting factor such that the luminance level of the target light source is higher than the base luminance level when the local APL of the filtered image part is less than a threshold.

9. The display device of claim 8, wherein calculating the modified local APL comprises:

determining a weight assigned to the maximum pixel luminance level based on the local APL of the filtered image part; and calculating the weighted average using the determined weight.

10. The display device of claim 8, wherein determining the luminance level of the target light source comprises multiplying the base luminance level by the boosting factor, and wherein determining the boosting factor comprises determining the boosting factor to be greater than one when the local APL of the filtered image part is less than the threshold.

11. The display device of claim 8, wherein the boosting factor is determined to allow the luminance level of the target light source to exceed an all-white luminance level that is a luminance level of the target light source based on pixel luminance levels of all the pixels of the target part of the input image having a maximum pixel luminance.

12. The display device of claim 3, wherein determining the luminance level of the target light source based on the modified local APL comprises:

determining a base luminance level based on the modified local APL;

determining a boosting factor determined based on a global APL of an entirety of the input image; and determining the luminance level of the target light source based on the base luminance level and the boosting factor such that the luminance level of the target light source is higher than the base luminance level when the global APL of the input image is less than a threshold.

13. The display device of claim 12, wherein determining the luminance level of the target light source comprises multiplying the base luminance level by the boosting factor, and wherein determining the boosting factor comprises determining the boosting factor to be greater than one when the global APL of the input image is less than the threshold.

14. A display driver, comprising:

a backlight control circuit coupled to a backlight device comprising a plurality of light sources that illuminate a display panel, wherein the backlight control circuit is configured to:

apply a filter to a target part of an input image to generate a filtered image part, wherein the target part of the input image is displayed in a corresponding region of the display panel illuminated by a target light source of the plurality of light sources; and control a luminance level of the target light source based on a maximum pixel luminance level of the filtered image part and a local average picture level (APL) of the filtered image part.

15. The display driver of claim 14, wherein the filter comprises filter coefficients assigned to respective pixels in the target part of the input image, wherein applying the filter to the target part of the input image comprises applying the filter coefficients to pixel luminance levels of the pixels of the target part of the input image, and wherein the filter coefficients are defined depending on respective distances between the pixels of the target part of the input image and a corresponding position of the target light source in the input image.

16. The display driver of claim 15, wherein controlling the luminance level of the target light source comprises:

calculating a modified local APL as a weighted average of the maximum pixel luminance level and the local APL of the filtered image part; and determining the luminance level of the target light source based on the modified local APL.

17. The display driver of claim 16, wherein calculating the modified local APL comprises:

determining a weight assigned to the maximum pixel luminance level; and calculating the weighted average using the determined weight.

18. The display driver of claim 17, wherein determining the weight assigned to the maximum pixel luminance level is based on the local APL of the filtered image part.

19. The display driver of claim 17, wherein determining the weight assigned to the maximum pixel luminance level is further based on a DBV of a display device that comprises the display driver.

20. A method comprising:

illuminating a display panel with a plurality of light sources of a backlight device;

applying a filter to a target part of an input image to generate a filtered image part, wherein the target part of an input image is displayed in a corresponding region of the display panel illuminated by a target light source of the plurality of light sources; and controlling a luminance level of the target light source based on a maximum pixel luminance level of the filtered image part and a local average picture level (APL) of the filtered image part.

* * * * *